United States Patent
Stretch et al.

(10) Patent No.: US 8,356,630 B2
(45) Date of Patent: Jan. 22, 2013

(54) VALVE DAMPING SYSTEM

(75) Inventors: Dale A. Stretch, Novi, MI (US); Jeffrey C. Thompson, Commerce Township, MI (US)

(73) Assignee: Eaton Corporation, Cleveland, OH (US)

( * ) Notice: Subject to any disclaimer, the term of this patent is extended or adjusted under 35 U.S.C. 154(b) by 688 days.

(21) Appl. No.: 12/477,009

(22) Filed: Jun. 2, 2009

(65) Prior Publication Data

US 2010/0236651 A1    Sep. 23, 2010

Related U.S. Application Data

(60) Provisional application No. 61/058,083, filed on Jun. 2, 2008.

(51) Int. Cl.
*F16K 1/44* (2006.01)

(52) U.S. Cl. .......... 137/625.35; 137/625.38; 251/64; 251/325

(58) Field of Classification Search .......... 137/625.28, 137/625.3, 625.35, 625.38; 251/64, 325
See application file for complete search history.

(56) References Cited

U.S. PATENT DOCUMENTS

| | | | |
|---|---|---|---|
| 1,911,785 A * | 5/1933 | Bailey | 137/614.11 |
| 3,112,764 A | 12/1963 | Anderson | |
| 3,381,708 A | 5/1968 | Chenoweth | |
| 3,596,569 A | 8/1971 | Wisbey | |
| 3,707,163 A | 12/1972 | Hugler | |
| 3,744,518 A | 7/1973 | Stacey | |
| 4,049,018 A | 9/1977 | Skibowski | |
| 4,257,572 A | 3/1981 | Neff | |
| 4,635,678 A | 1/1987 | Peterman et al. | |
| 4,805,516 A | 2/1989 | Mori et al. | |
| 5,107,753 A | 4/1992 | Ioku | |
| 5,207,059 A | 5/1993 | Schexnayder | |
| 5,497,805 A | 3/1996 | Sunamura et al. | |
| 5,549,276 A * | 8/1996 | Pittman et al. | 251/214 |
| 6,102,074 A | 8/2000 | Bouteille | |
| 6,554,014 B2 | 4/2003 | Beyrak | |
| 7,104,283 B2 | 9/2006 | Ino et al. | |

(Continued)

FOREIGN PATENT DOCUMENTS

DE    102004049314 A1    12/2005
EP    0754866 A2    1/1997

(Continued)

OTHER PUBLICATIONS

International Search Report for PCT/US2010/037116 dated Oct. 5, 2010.

(Continued)

*Primary Examiner* — Craig Schneider
(74) *Attorney, Agent, or Firm* — Rader, Fishman & Grauer PLLC

(57) ABSTRACT

A valve is provided including a first valve member and a second valve member. The first valve member includes a first step and a first orifice adjacent the first step. The second valve member includes a second step and a second orifice adjacent the second step. The second valve member is movable relative to the first valve member between an open position, in which the first orifice is fluidly connected the second orifice, and a closed position, in which the first orifice is substantially fluidly disconnected from the second orifice. The first and second steps are fluidly connected to the second orifice and substantially fluidly disconnected from the first orifice when the second valve member is in the closed position, and the first and second steps are fluidly connected to the first and second orifices when the second valve member is in the open position.

10 Claims, 30 Drawing Sheets

U.S. PATENT DOCUMENTS

| | | |
|---|---|---|
| 2007/0181196 A1 | 8/2007 | Sturman |
| 2008/0041469 A1 | 2/2008 | Dantlgraber et al. |
| 2009/0293971 A1* | 12/2009 | Stretch ............... 137/625.11 |
| 2009/0293976 A1* | 12/2009 | Stretch ............... 137/877 |
| 2009/0294709 A1* | 12/2009 | Stretch et al. ............... 251/12 |
| 2009/0294710 A1* | 12/2009 | Stretch ............... 251/25 |
| 2010/0012204 A1* | 1/2010 | Stretch et al. ............... 137/565.01 |

FOREIGN PATENT DOCUMENTS

| | | |
|---|---|---|
| EP | 0959280 A1 | 11/1999 |
| EP | 1197692 A1 | 4/2002 |
| EP | 1526289 A2 | 4/2005 |
| FR | 1397596 A | 4/1965 |
| FR | 2098231 A1 | 3/1972 |
| GB | 864635 A | 4/1961 |

OTHER PUBLICATIONS

International Search Report for PCT/US2010/037121 dated Oct. 1, 2010.
English abstract for EP-1526289-A2.
English abstract for DE-102004049314-A1.
International Search Report for PCT/US2009/045984 dated Aug. 18, 2010.

* cited by examiner

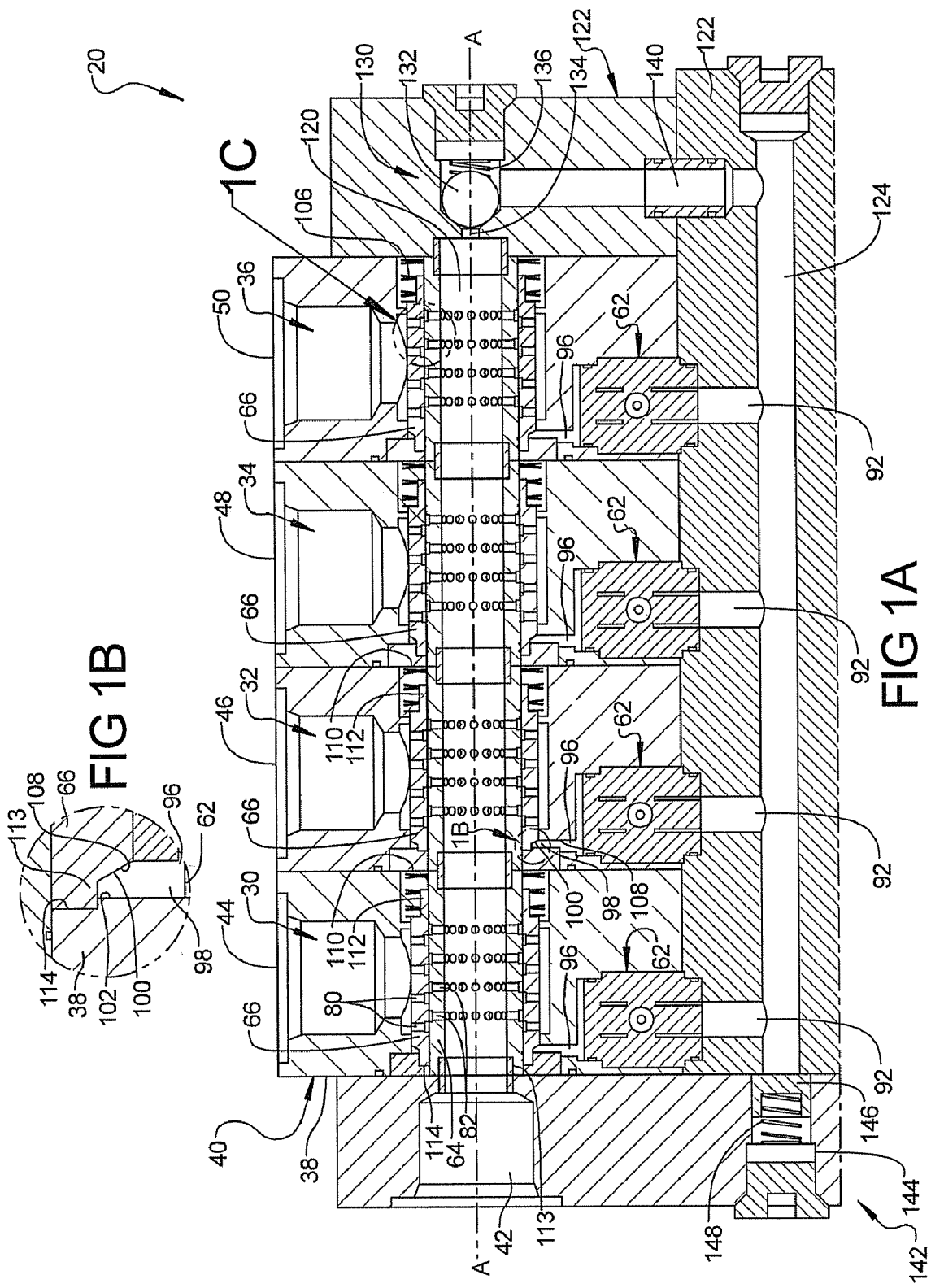

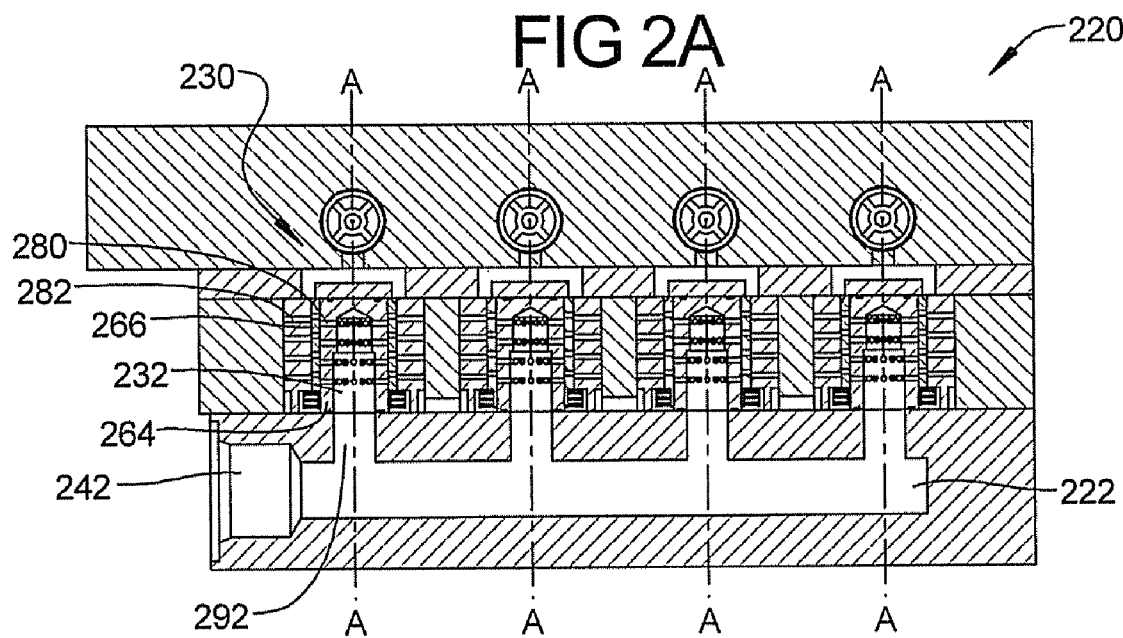
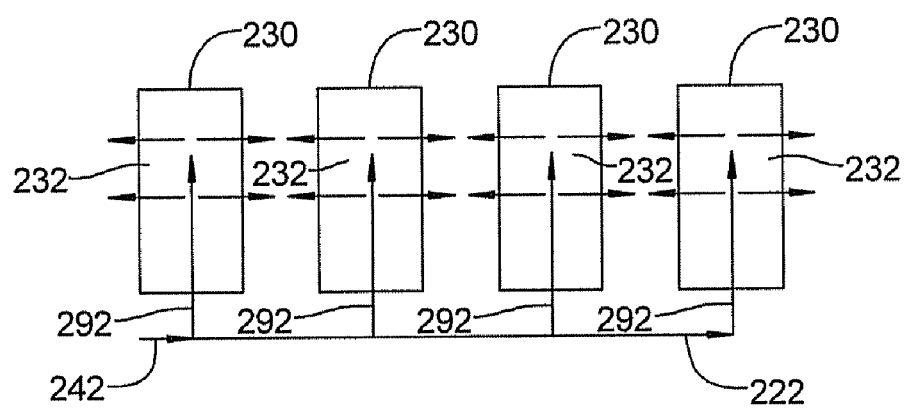

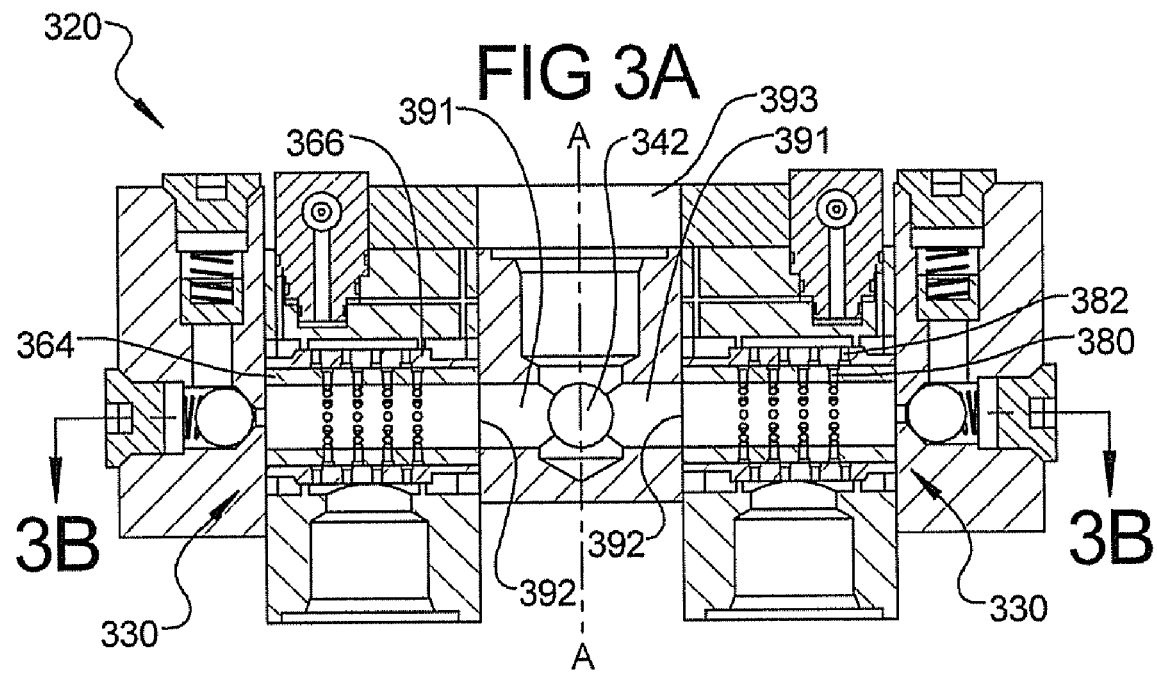
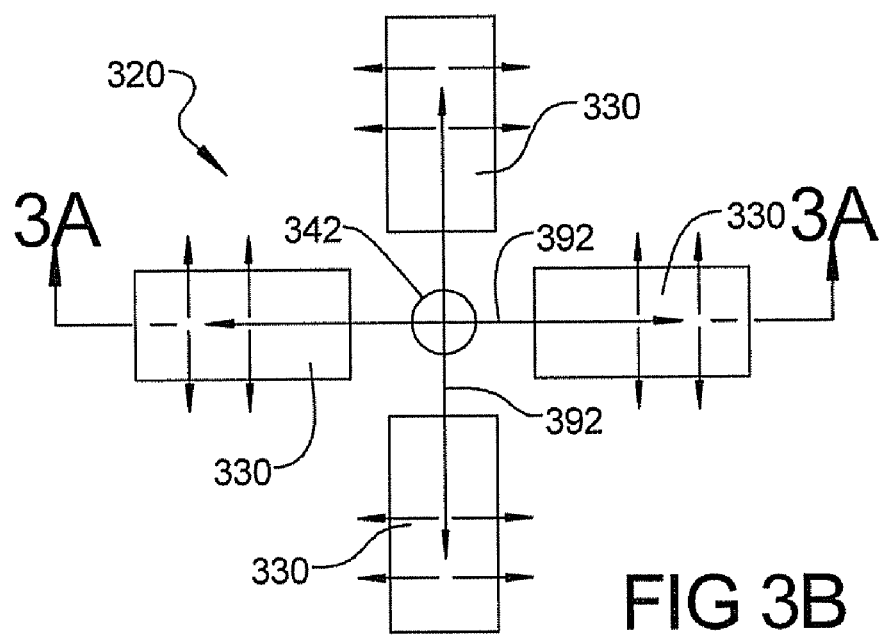

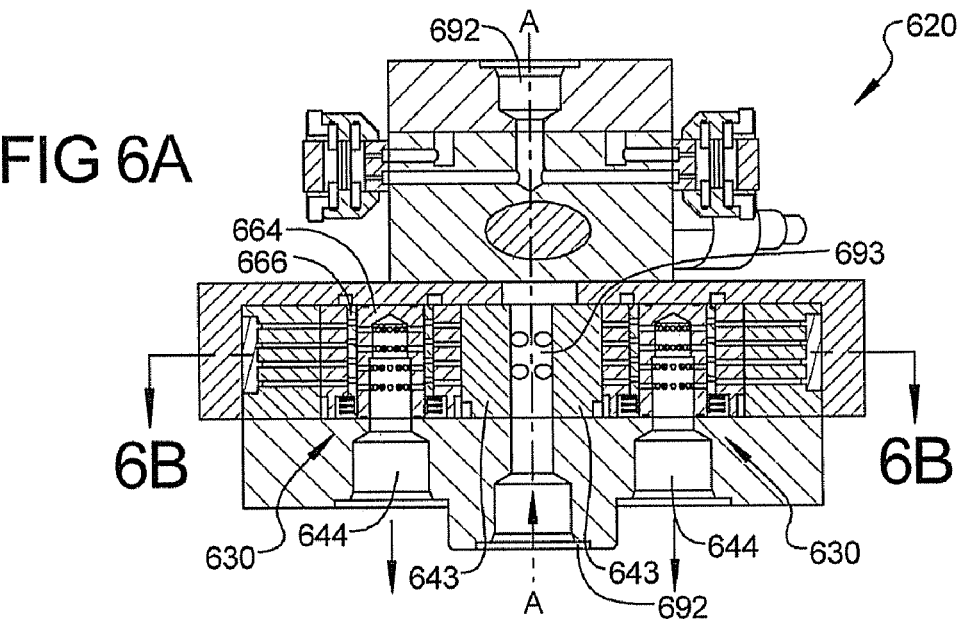
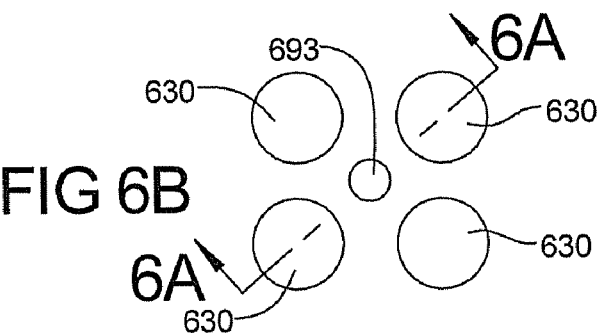
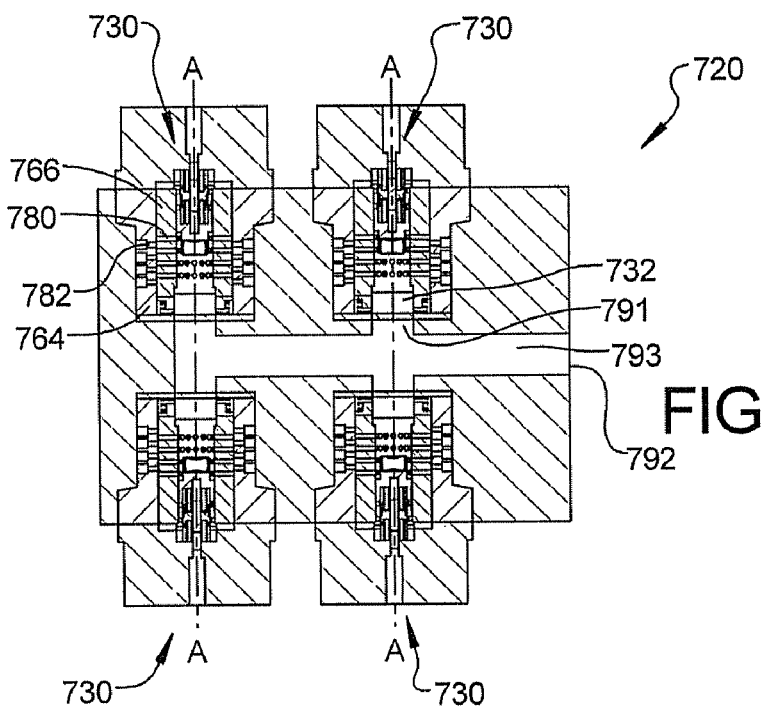

PILOT VALVE ARRANGED EXTERNALLY ALONGSIDE THE MAIN-STAGE VALVE

PILOT VALVE ARRANGED EXTERNALLY ON THE END OF THE MAIN-STAGE VALVE

PILOT VALVE ARRANGED INTERNALLY TO THE MAIN-STAGE VALVE

TABLE #2

A "0" MEANS THE VALVE IS SHUTTING OFF FLUID FLOW OR DUMPING PRESSURE TO DRAIN
A "1" MEANS THE VALVE IS FLOWING FLUID OR THERE IS PRESSURE SUPPLIED

| CONFIG. | PILOT VALVE POSITION | | | | | MAINSTAGE VALVE POSITION | | | |
|---|---|---|---|---|---|---|---|---|---|
| | A | B | C | D | E | 1 | 2 | 3 | 4 |
| 1 | 1 | 0 | 0 | 0 | 0 | 1 | 0 | 0 | 0 |
| 2 | 0 | 1 | 0 | 0 | 0 | 0 | 1 | 0 | 0 |
| 3 | 0 | 0 | 1 | 0 | 0 | 0 | 0 | 1 | 0 |
| 4 | 0 | 0 | 0 | 1 | 0 | 0 | 0 | 0 | 1 |
| 5 | 0 | 0 | 0 | 0 | 1 | 0 | 0 | 0 | 0 |
| 6 | 0 | 0 | 0 | 0 | 0 | 0 | 0 | 0 | 0 |

FIG 17

TABLE #1

A "0" MEANS THE VALVE IS SHUTTING OFF FLUID FLOW OR DUMPING PRESSURE TO DRAIN
A "1" MEANS THE VALVE IS FLOWING FLUID OR THERE IS PRESSURE SUPPLIED
A "LC" MEANS THE VALVE FLOWING STAGE DEPENDS ON THE LAST CONDITION IN WHICH THE SPECIFIED MAINSTAGE ACTUATORS WERE EXPOSED

| CONFIG. | PILOT VALVE POSITION | | | | | MAINSTAGE VALVE POSITION | | | |
|---|---|---|---|---|---|---|---|---|---|
| | A | B | C | D | E | 1 | 2 | 3 | 4 |
| 1 | 1 | 0 | 0 | 0 | 0 | 1 | LC | LC | LC |
| 2 | 0 | 1 | 0 | 0 | 0 | 0 | 1 | LC | LC |
| 3 | 0 | 0 | 1 | 0 | 0 | LC | 0 | 1 | LC |
| 4 | 0 | 0 | 0 | 1 | 0 | LC | LC | 0 | 1 |
| 5 | 0 | 0 | 0 | 0 | 1 | LC | LC | LC | 0 |
| 6 | 0 | 0 | 0 | 0 | 0 | LC | LC | LC | LC |

FIG 15

TABLE #3

| CONFIG. | PILOT VALVE POSITION | | | | | MAINSTAGE VALVE POSITION | | | |
|---|---|---|---|---|---|---|---|---|---|
| | A | B | C | D | E | 1 | 2 | 3 | 4 |
| 1 | 1 | 1 | 1 | 1 | 1 | 0 | 0 | 0 | 0 |
| 2 | 1 | 1 | 1 | 1 | 0 | 0 | 0 | 0 | 1 |
| 3 | 1 | 1 | 1 | 0 | 1 | 0 | 0 | 1 | 0 |
| 4 | 1 | 1 | 0 | 1 | 1 | 0 | 1 | 0 | 0 |
| 5 | 1 | 0 | 1 | 1 | 1 | 1 | 0 | 0 | 0 |
| 6 | 0 | 1 | 1 | 1 | 1 | 0 | 0 | 0 | 0 |
| 7 | 1 | 1 | 1 | 0 | 0 | 0 | 0 | 1 | 0 |
| 8 | 1 | 1 | 0 | 1 | 0 | 0 | 1 | 0 | 1 |
| 9 | 1 | 0 | 1 | 1 | 0 | 1 | 0 | 0 | 1 |
| 10 | 0 | 1 | 1 | 1 | 0 | 0 | 0 | 0 | 1 |
| 11 | 1 | 1 | 0 | 0 | 1 | 0 | 1 | 0 | 0 |
| 12 | 1 | 0 | 1 | 0 | 1 | 1 | 0 | 1 | 0 |
| 13 | 0 | 1 | 1 | 0 | 1 | 0 | 0 | 1 | 0 |
| 14 | 1 | 1 | 1 | 0 | 0 | 0 | 0 | 1 | 0 |
| 15 | 1 | 0 | 0 | 1 | 1 | 1 | 0 | 0 | 0 |
| 16 | 0 | 1 | 0 | 1 | 1 | 0 | 1 | 0 | 0 |
| 17 | 1 | 1 | 0 | 1 | 0 | 0 | 1 | 0 | 1 |
| 18 | 1 | 1 | 0 | 0 | 1 | 0 | 1 | 0 | 0 |
| 19 | 0 | 0 | 1 | 1 | 1 | 0 | 0 | 0 | 0 |
| 20 | 1 | 0 | 1 | 1 | 0 | 1 | 0 | 1 | 1 |
| 21 | 1 | 0 | 1 | 0 | 1 | 1 | 0 | 1 | 0 |
| 22 | 1 | 0 | 0 | 1 | 1 | 1 | 0 | 0 | 0 |
| 23 | 0 | 1 | 1 | 1 | 0 | 0 | 0 | 0 | 1 |
| 24 | 0 | 1 | 1 | 0 | 1 | 0 | 0 | 1 | 0 |
| 25 | 0 | 1 | 0 | 1 | 1 | 0 | 1 | 0 | 0 |
| 26 | 0 | 0 | 1 | 1 | 1 | 0 | 0 | 0 | 0 |

FIG 18a

| CONFIG. | PILOT VALVE POSITION | | | | | MAINSTAGE VALVE POSITION | | | |
|---|---|---|---|---|---|---|---|---|---|
| | A | B | C | D | E | 1 | 2 | 3 | 4 |
| 27 | 1 | 0 | 1 | 0 | 0 | 1 | 0 | 1 | 0 |
| 28 | 1 | 0 | 0 | 1 | 0 | 1 | 0 | 0 | 1 |
| 29 | 1 | 0 | 1 | 1 | 0 | 1 | 0 | 0 | 1 |
| 30 | 0 | 0 | 1 | 1 | 0 | 0 | 0 | 0 | 1 |
| | | | | | | | | | |
| 31 | 0 | 1 | 0 | 0 | 1 | 0 | 1 | 0 | 0 |
| 32 | 0 | 0 | 1 | 0 | 1 | 0 | 0 | 1 | 0 |
| 33 | 0 | 1 | 1 | 0 | 1 | 0 | 0 | 1 | 0 |
| 34 | 0 | 1 | 1 | 0 | 0 | 0 | 0 | 1 | 0 |
| | | | | | | | | | |
| 35 | 1 | 0 | 0 | 1 | 0 | 1 | 0 | 0 | 1 |
| 36 | 0 | 1 | 0 | 1 | 0 | 0 | 1 | 0 | 1 |
| 37 | 1 | 1 | 0 | 1 | 0 | 0 | 1 | 0 | 1 |
| 38 | 1 | 1 | 0 | 0 | 0 | 0 | 1 | 0 | 0 |
| | | | | | | | | | |
| 39 | 0 | 0 | 1 | 0 | 1 | 0 | 0 | 1 | 0 |
| 40 | 1 | 0 | 1 | 0 | 0 | 1 | 0 | 1 | 0 |
| 41 | 1 | 0 | 1 | 0 | 1 | 1 | 0 | 1 | 0 |
| 42 | 1 | 0 | 0 | 0 | 1 | 1 | 0 | 0 | 0 |
| | | | | | | | | | |
| 43 | 0 | 1 | 0 | 1 | 0 | 0 | 1 | 0 | 1 |
| 44 | 0 | 1 | 0 | 0 | 1 | 0 | 1 | 1 | 0 |
| 45 | 0 | 1 | 0 | 1 | 1 | 0 | 1 | 1 | 0 |
| 46 | 0 | 0 | 0 | 1 | 1 | 0 | 0 | 1 | 0 |
| | | | | | | | | | |
| 47 | 0 | 0 | 0 | 0 | 0 | 0 | 0 | 0 | 0 |
| 48 | 1 | 0 | 0 | 0 | 0 | 1 | 0 | 0 | 0 |
| 49 | 0 | 1 | 0 | 0 | 0 | 0 | 1 | 0 | 0 |
| 50 | 0 | 0 | 1 | 0 | 0 | 0 | 0 | 1 | 0 |
| 51 | 0 | 0 | 0 | 1 | 0 | 0 | 0 | 0 | 1 |
| 52 | 0 | 0 | 0 | 0 | 1 | 0 | 0 | 0 | 0 |

FIG 18b

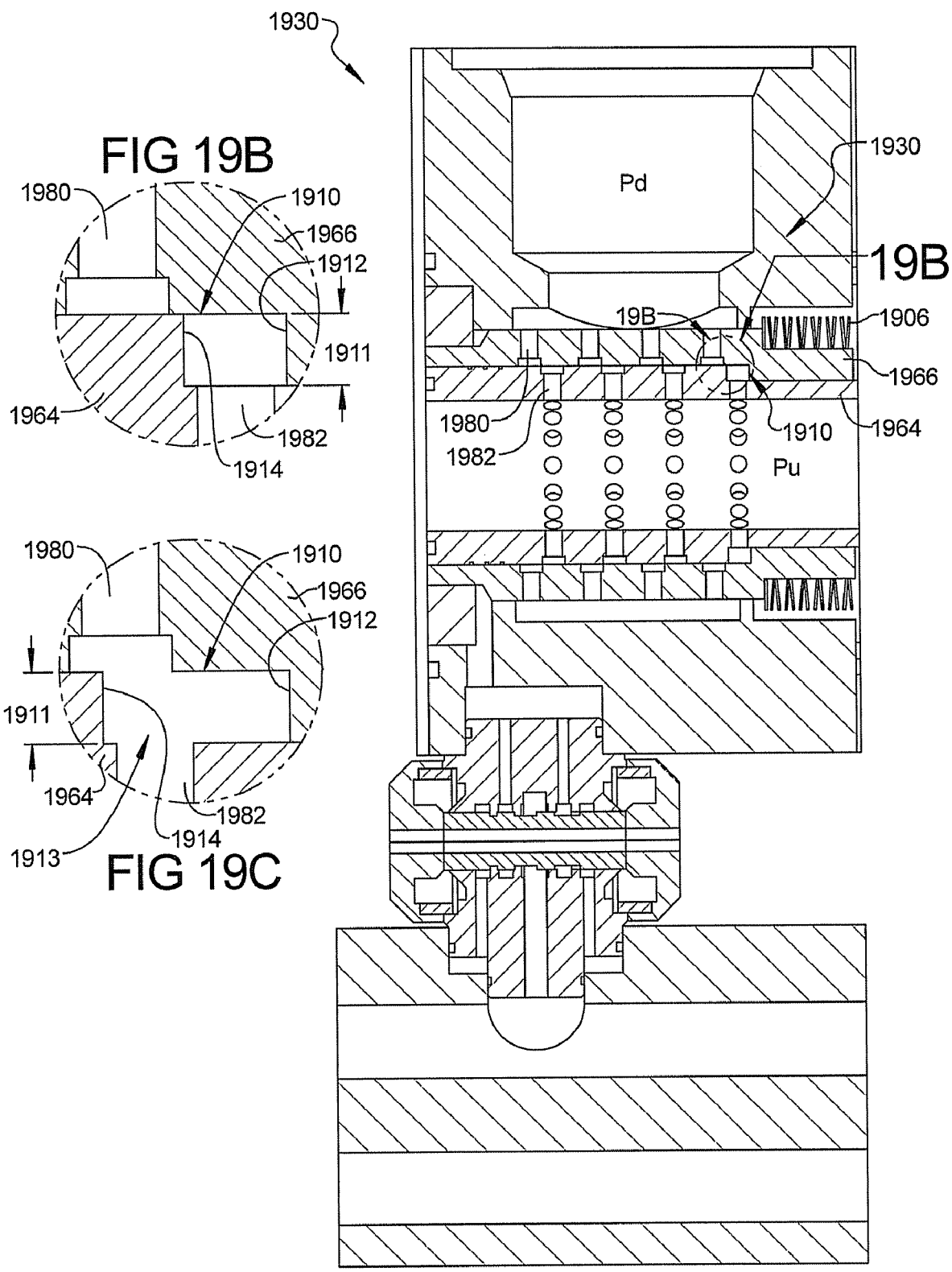

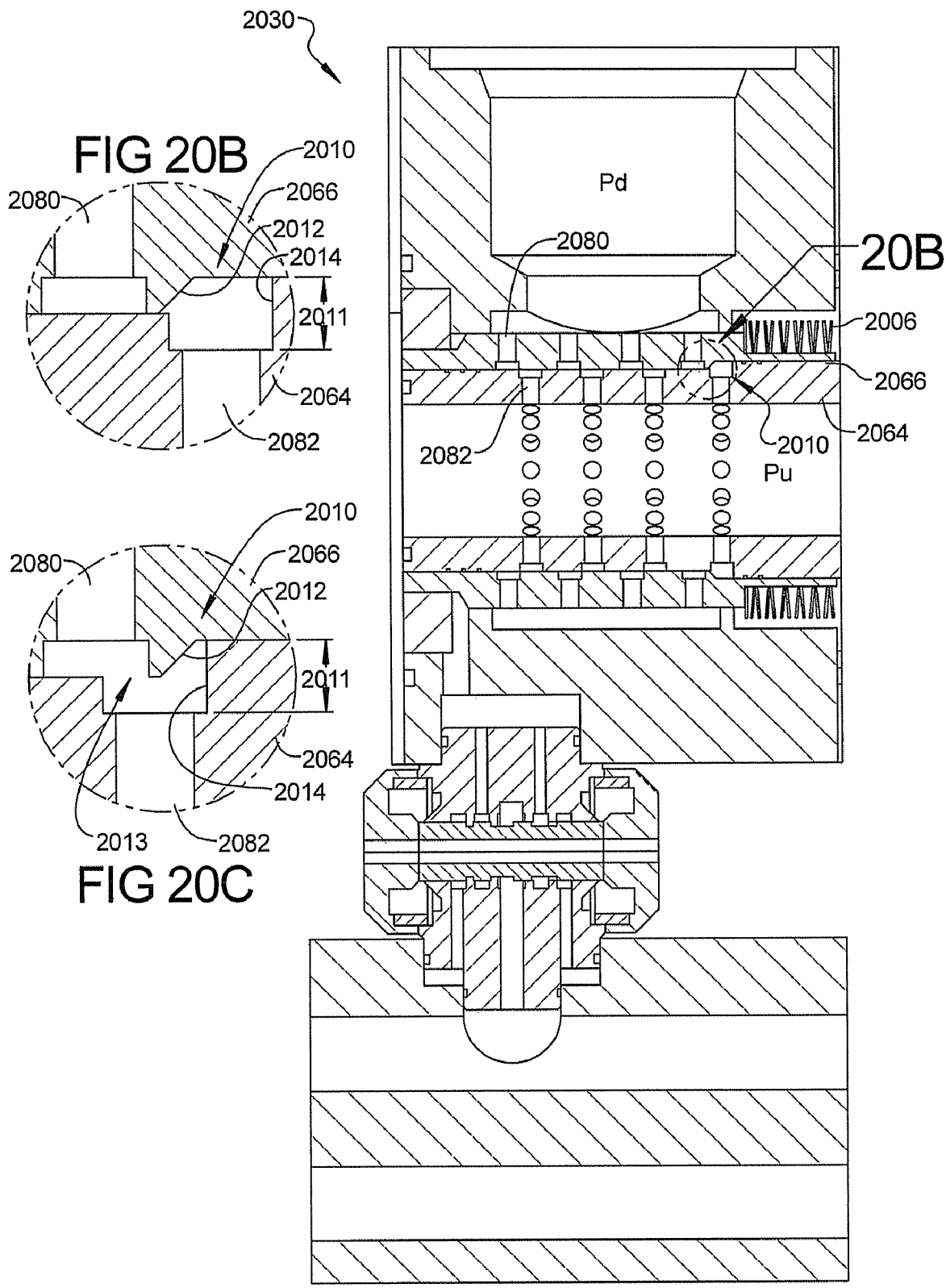

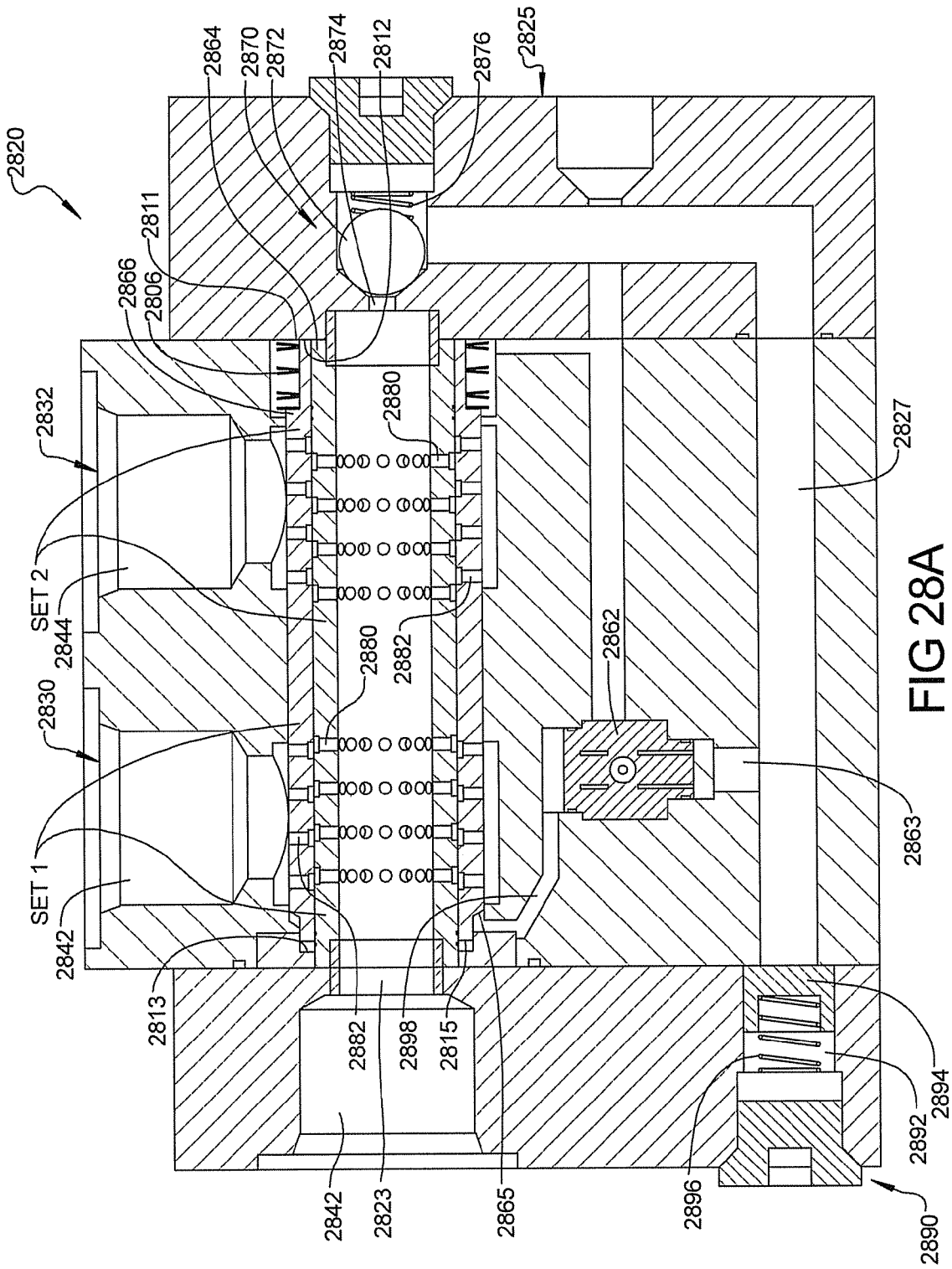

VALVE DAMPING SYSTEM

CROSS REFERENCE TO RELATED APPLICATIONS

This application claims priority to U.S. provisional patent application 61/058,083, filed Jun. 2, 2008, which is incorporated by reference in its entirety.

BACKGROUND

A hydraulic system may include multiple hydraulic loads, each of which may have different flow and pressure requirements that can vary over time. The hydraulic system may include a pump for supplying a flow of pressurized fluid to the hydraulic loads. The pump may have a variable or fixed displacement configuration. Fixed displacement pumps are often smaller, lighter, and less expensive than variable displacement pumps. Generally, fixed displacement pumps deliver a definite volume of fluid for each cycle of pump operation. The output volume of a fixed displacement pump can be controlled by adjusting the speed of the pump. Closing or otherwise restricting the outlet of a fixed displacement pump will cause a corresponding increase in the system pressure. To avoid over pressurizing the hydraulic system, fixed displacement pumps typically utilize a pressure regulator or an unloading valve to control the pressure level within the system during periods in which the pump output exceeds the flow requirements of the multiple hydraulic loads. The hydraulic system may further include various valves for controlling the distribution of the pressurized fluid to the multiple loads.

BRIEF DESCRIPTION OF THE DRAWINGS

FIG. 1A is a side cross-sectional view of an exemplary valve manifold including a main-stage manifold and a pilot valve manifold.

FIG. 1B is an enlarged view of a portion of the main-stage manifold in FIG. 1A.

FIG. 2A is an illustration of an exemplary main-stage manifold employing multiple main-stage valves arranged in a co-parallel configuration.

FIG. 2B is a schematic illustration of the co-parallel valve configuration in FIG. 2A.

FIG. 3A is an illustration of exemplary main-stage manifold employing multiple main-stage valves arranged in a radial configuration.

FIG. 3B is a schematic illustration of the radial valve configuration in FIG. 3A.

FIG. 6A is an illustration of an exemplary main-stage manifold employing multiple main-stage valves arranged in an annular configuration.

FIG. 6B is a schematic illustration of the annular valve configuration in FIG. 6A.

FIG. 7A is an exemplary main-stage manifold employing multiple main-stage valves arranged in a 2×2 co-axial configuration.

FIG. 15 provides a logic table identifying various options for controlling the operation of the main-stage valves employed with the exemplary hydraulic system of FIG. 14.

FIG. 17 provides a logic table identifying various options for controlling the operation of the main-stage valves employed with the exemplary hydraulic system of FIG. 16.

FIGS. 18a and 18b provide a logic table identifying various additional options for controlling the operation of the main-stage valves employed with the exemplary hydraulic system of FIG. 16.

FIG. 19A is a cross-sectional view of an exemplary main-stage valve employing an integrated pressure assist mechanism configured to open the main-stage valve in response to an upstream pressure.

FIG. 19B is an enlarged view of a portion of the main-stage valve in FIG. 19A, shown arranged in a closed position.

FIG. 19C is a view of the portion of the main-stage valve shown in FIG. 19B arranged in an open position.

FIG. 20A is a cross-sectional view of an exemplary main-stage valve employing an integrated pressure assist mechanism configured to close the main-stage valve in response to an upstream pressure.

FIG. 20B is an enlarged view of a portion of the main-stage valve shown in FIG. 20A arranged in a closed position.

FIG. 20C is a view of the portion of the main-stage valve shown in FIG. 20B arranged in an open position.

FIG. 21B is an enlarged view of a portion of the main-stage valve in FIG. 21A arranged in a closed position.

FIG. 21C is a view of the portion of the main-stage valve shown in FIG. 21B arranged in an open position.

FIG. 22B is a view of a portion of the main-stage valve in FIG. 22A arranged in a closed position.

FIG. 22C is a view of the portion of the main-stage valve shown in FIG. 22B arranged in an open position.

FIG. 28A is a partial cross-sectional view of an exemplary main-stage manifold employing multiple main-stage valves sharing a common spool and sleeve, with the spool arranged in a first position.

DETAILED DESCRIPTION

Figure 1C:
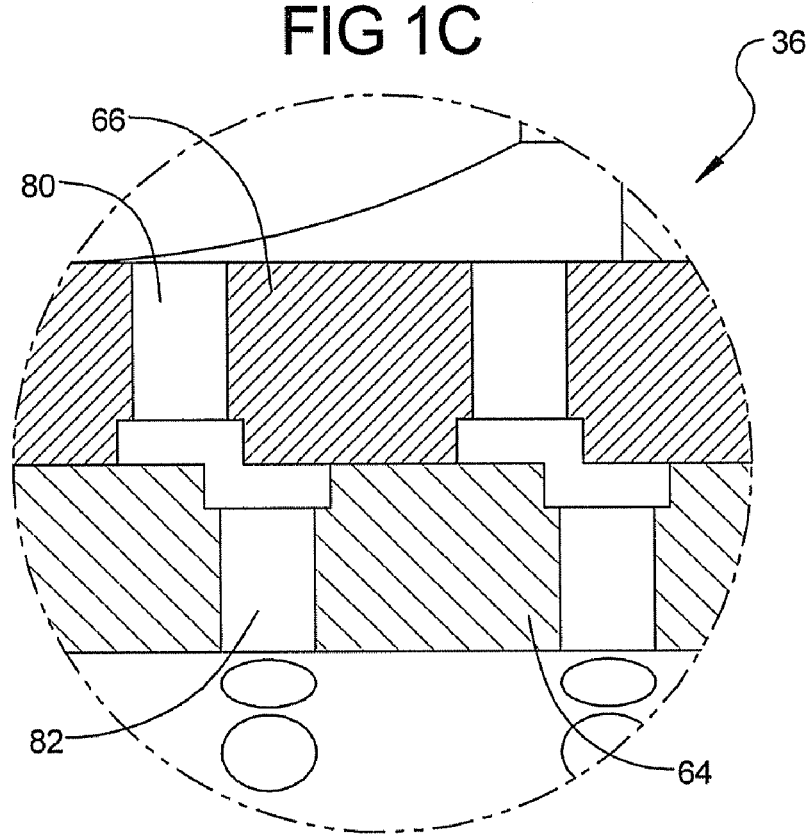
FIG. 1C is an enlarged view of a portion of the main-stage manifold in FIG. 1A.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the disclosed device. Further, the descriptions set forth herein are not intended to be exhaustive or otherwise limit or restrict the claims to the precise forms and configurations shown in the drawings and disclosed in the following detailed description.

FIG. 1A illustrates an exemplary hydraulic manifold 20 for controlling the distribution of a pressurized fluid to multiple hydraulic loads having variable flow and pressure requirements. For purposes of discussion, the manifold 20 is shown to include four separate valves identified as main-stage valves 30, 32, 34 and 36, respectively. Although the manifold 20 is shown to include four valves 30, 32, 34 and 36 the manifold 20 may include fewer or more valves depending on the requirements of the particular application. Each main-stage valve may be fluidly connected to one or more hydraulic loads. By way of example, the hydraulic loads may include, but are not limited to, various hydraulically actuated devices, such as a hydraulic cylinder and a hydraulic motor. The main-stage valves control the operation of the hydraulic loads by selectively adjusting the pressure and flow of fluid to the respective hydraulic loads.

The valves 30, 32, 34 and 36 may be appropriately configured to enable the valves to be interconnected in various configurations to form a main-stage manifold. In the main-stage manifold configuration illustrated in FIG. 1A, the main-stage valves are stacked together in a co-linear fashion. The term "collinear" denotes that the individual valve spools are generally arranged end-to-end in a linear fashion. The main-stage valves may also be arranged in a variety of other configurations, examples of which are described subsequently.

The exemplary main-stage manifold may include an inlet port 42 through which the high pressure fluid enters the manifold 20. Four exit ports 44, 46, 48 and 50—one for each of the four main-stage valves—may be fluidly connected to a corresponding hydraulic load. The inlet port 42 may be fluidly connected to a source of pressurized fluid, such as a fixed displacement pump (not shown). A wide variety of pump configurations may be utilized, including but not limited, gear pumps, vane pumps, axial piston pumps, and radial piston pumps. It shall be appreciated, however, that other devices capable of generating a flow of pressurized fluid may also be utilized. Pressurized fluid received from the fluid source enters the manifold 20 through the inlet port 42 and exits the main-stage manifold through one or more of the exit ports 44, 46, 48 and 50. The valves 30, 32, 34 and 36 selectively control the flow of pressurized fluid from the inlet port 42 to the respective exit ports 44, 46, 48 and 50.

Each of the valves 30, 32, 34 and 36 may include a hydraulically actuated spool valve 40. Each of the valves 30, 32, 34 and 36 includes a valve body 38 and a spool valve 40 disposed within the valve body 38. Each of the spool valves 40 may include a generally cylindrical-shaped hollow sleeve, illustrated as sleeves 64, that are fixed relative to the valve body 38, and a generally cylindrical-shaped spool, illustrated as spools 66, which are slideably disposed around the outside of the sleeve 64. The spools 66 are free to move back and forth over a portion of the length of the sleeve 64. Although the terms "spool" and "sleeve" are commonly used to describe components of a spool valve, the terms are not always used consistently to refer to the same components. Accordingly, throughout this application, the term "sleeve" shall refer to the stationary component and the term "spool" shall refer to the component that is moveable relative to the stationary component. Thus, with respect to the presently described spool valve 40, since the inner member is fixed relative to the valve body 38, it shall be referred to as the "sleeve", whereas the outer member, which is described as being moveable relative to the sleeve, shall be referred to as the "spool". If, on the other hand, the outer member were fixed relative to the valve body and the inner member were moveable relative to the outer member, the inner member would be referred to as the "spool" and the outer member would be referred to as the "sleeve".

The sleeves 64 and the spools 66 each may include a series of orifices that extend through the walls of the respective components, where each of the spools 66 include a series of orifices 80 and the sleeves 64 include a series of orifices 82. The orifices 80 and 82 are generally arranged in a common pattern to enable the orifices 80 in the spool 66 to be generally aligned with the orifices 82 in the sleeve 64 when the spool 66 is positioned in an open position relative to the sleeve 64, as shown in FIG. 1C. The valves 30, 32, 34 and 36 can be arranged in an open position (for example, valve 36 as shown in FIG. 1C) by sliding the spool 66 axially relative to the sleeve 64 so as to align the orifices 80 in the spool 66 with the orifices 82 in the sleeve 64. Such an arrangement allows pressurized fluid to pass through the spool valves 40 to the exit ports 44, 46, 48 and 50 of the valves 30, 32, 34 and 36, respectively. The spool 66 can be returned to a closed position (for example, valve 36 as seen in FIG. 1A) by sliding the spool 66 axially relative to the sleeve 64 so as to intentionally misalign the orifices in the spool 66 and the sleeve 64 to block the flow of fluid through the valve. The spools 66 of each of the four valves 30, 32, 34 and 36 are depicted in FIG. 1A in the closed position.

The valves 30, 32, 34 and 36 may be hydraulically actuated such as by way of a solenoid operated pilot valve 62. The pilot valve 62 may include an inlet port 92 fluidly connected to a pressure source. Turning to FIG. 1B, an outlet port 96 of the pilot valve 62 may be fluidly connected to a fluid cavity 98 at least partially defined by a notched region 100 in the spool 66 and a wall 102 of the valve body 38. The notched region 100 of each spool 66 includes a generally vertically oriented surface 108. Pressurizing the fluid cavity 98 exerts a generally axial force against the surface 108 of the spool 66, which tends to displace the spool 66 axially relative to the sleeve 64 to the open position.

Turning back to FIG. 1A, the spool valves may each employ a biasing member 106, which may include a variety of configurations, such as a coil spring and a leaf spring, for moving the spool 66 from the open position to the closed position. The spool valve may also be configured to have the biasing member move the spool 66 from the closed position to the open position. The biasing member 106 exerts a biasing force against the spool 66 that may be generally opposite the biasing force produced by pressurizing the fluid cavity 98 at the opposite end of the spool 66. The valves 30, 32, 34 and 36 can be positioned in the open position by sufficiently pressurizing the fluid cavity 98 to overcome the biasing force produced by the biasing member 106. Doing so causes the spool 66 to slide axially relative to the sleeve 64 so as to fluidly connect the orifices 80 of the spool 66 with the orifices 82 of the sleeve 64, as shown in FIG. 1C. The positioning of the spool 66 relative to the sleeve 64 may be controlled by means of a stop 110 that engages a first end 112 of the spool 66, or another suitable region of the spool 66, when the orifices 80 in the spool 66 are fluidly connected to the orifices 82 in the sleeve 64. Other mechanisms may also be employed for controlling the positioning of the sleeve 64 relative to the spool 66.

The spool 66 may be positioned in the closed position by adjusting the pilot valve 62, so as to depressurize the fluid cavity 98. This allows the biasing force exerted by the biasing member 106 to slide the spool 66 axially to the closed position. The orifices 80 in the spool 66 are intentionally axially misaligned with the orifices 82 in the sleeve 64 when the spool 66 is positioned in the closed position. The positioning of the spool 66 in the closed position may be controlled by having an end 113 of the spool 66, or another suitable region of the spool 66, engage a second stop 114 positioned opposite the stop 110.

The valves 30, 32, 34 and 36 may be configured such that either the inner or outer member operates as the spool 66. In the exemplary main-stage valve illustrated in FIG. 1A, the inner member functions as the sleeve 64 and the outer member functions as the spool 66 (i.e., is movable relative to the sleeve). As an alternative illustration, however, the inner member may be configured to operate as the spool 66 and the outer member as the sleeve 64. Further, the valves 30, 32, 34 and 36 may also be configured such that both the inner and outer members move simultaneously move in opposite directions relative to one another and the valve body 38. This latter configuration may produce faster valve actuation speeds, but may also result in systems that are more complex.

Although the flow of pressurized fluid is described as passing radially outward through the exemplary valves 30, 32, 34 and 36 when in the open position, it shall be appreciated that the main-stage manifold may also be configured such that the flow passes radially inward. In that case, the passages designated as the respective exit ports 44, 46, 48 and 50 in FIG. 1A would operate as an inlet port, and the passage designated as the inlet port 42 would operate as an exit port. The direction in which the pressurized fluid passes through the valves 30, 32, 34 and 36 is not dependent on whether the inner or outer valve member operates as the spool, or whether both members are moveable relative to one another when the valves are actuated.

The valves 30, 32, 34 and 36, and the pilot valve 62 may have separate pressure supplies or may share a common pressure source. In the exemplary manifold configuration illustrated in FIG. 1A, the valves 30, 32, 34 and 36, and the pilot valve 62, are shown sharing a common pressure source. The pressurized fluid for supplying both the valves 30, 32, 34 and 36, and the pilot valve 62, enters the main-stage manifold through the inlet port 42. The inlet port 42 is fluidly connected to the sleeve 64 of the first valve 30.

The sleeves 64 of the valves 30, 32, 34 and 36 may be connected in series to form an elongated plenum 120. Fluidly connected to a downstream end of the sleeve 64 of the last valve 36 in the series is a pilot manifold 122. The pilot manifold 122 includes a pilot supply passage 124 through which a portion of pressurized fluid may be bled from the main-stage fluid supply and delivered to the pilot valves 62. The inlet port 92 of each of the pilot valves 62 may be fluidly connected to the pilot supply passage 124. Upon actuating at least one of the pilot valves 62, a portion of fluid present in the pilot supply passages 124 passes through the pilot valve 62 to the fluid cavity 98 adjoining the spool 66, thereby actuating at least one of the valves 30, 32, 34 and 36 to the open position.

Continuing to refer to FIG. 1A, the pilot manifold 122 may include a check valve 130. The check valve 130 operates to control the flow of pressurized fluid delivered to the pilot manifold 122, and also to prevent fluid from back flowing from the pilot manifold 122 to plenum 120. The check valve 130 may have any of a variety of configurations. An example of one such configuration is illustrated in FIG. 1A, where a ball check valve is utilized to control the flow of fluid to and from the pilot manifold 122. The check valve 130 includes a ball 132 that selectively engages an inlet passage 134 of the pilot manifold 122. A spring 136 may be provided for biasing the ball 132 into engagement with the inlet passage 134 of the pilot manifold 122. When the pressure drop across the check valve 130 exceeds the biasing force exerted by the spring 136, the ball 132 will disengage the inlet passage 134 of the pilot manifold 122 to allow pressurized fluid to flow from the plenum 120 to the pilot manifold 122. The rate at which fluid flows from the hydraulic manifold 20 to the pilot manifold 122 is dependent on the pressure drop across the check valve 130. The greater the pressure drop, the higher the flow rate. In instances where the pressure drop across the check valve 130 is less then the biasing force of the spring 136, or the pressure within the pilot manifold 122 exceeds the pressure within the plenum 120, the check valve ball 132 will engage the inlet passage 134 of the pilot manifold 122 to prevent flow from passing through the check valve 130 in either direction. The spring rate of the spring 136 can be selected so as to prevent the check valve 130 from opening until a desired pressure drop across the check valve 134 is achieved.

The pilot manifold 122 may also employ a filter 140 to remove debris from hydraulic fluid. The filter 140 may be deployed in the pilot supply passage 124 connecting the pilot valves 62 to the manifold 20. A wide variety of filters 140 may be employed, including but not limited to, a band filter and a cartridge filter, as well as others. A band filter has the advantage of being cost effective, generally has a smaller packaging envelope than a cartridge filter, and may potentially be able to tolerate higher pressure drops. A cartridge filter, on the other hand, can be replaced if it becomes clogged and generally has a larger filtering surface area than a band filter, but may also require a larger packaging envelope.

The pilot manifold 122 may also include an accumulator 142 for storing pressurized fluid used to actuate the valves 30, 32, 34 and 36. The accumulator 142 may have any of a variety of configurations. For example, one version depicted in FIG. 1A may include a fluid reservoir 144 for receiving and storing pressurized fluid. The reservoir 144 may be fluidly connected to the pilot manifold 122. The accumulator 142 may include a moveable piston 146 positioned within the reservoir 144. The positioning of the piston 146 within the reservoir 144 can be adjusted to selectively vary the volume of the reservoir 144. A biasing mechanism 148, such as a coil spring, urges the piston 146 in a direction that tends to minimize the volume of the reservoir 144. The biasing mechanism 148 exerts a biasing force that opposes the pressure force exerted by the pressurized fluid present within the pilot manifold 122. If the two opposing forces are unbalanced, the piston 146 will be displaced to either increase or decrease the volume of the reservoir 144, thereby restoring the balance between the two opposing forces. In at least some situations, the pressure level within the reservoir 144 corresponds to the pressure within the pilot manifold 122. If the pressure force within the reservoir 144 exceeds the opposing force generated by the biasing mechanism 148, the piston 146 will be displaced toward the biasing mechanism 148, thereby increasing the volume of the reservoir 144 and the amount of fluid that can be stored in the accumulator 142. As the reservoir 144 continues to fill with fluid, the opposing force generated by the biasing mechanism 148 will also increase to the point at which the biasing force and the opposing pressure force exerted from within the reservoir 144 are substantially equal. The volumetric capacity of the reservoir 144 will remain substantially constant when the two opposing forces are at equilibrium. On the other hand, actuating one or more of the pilot valves 62 will generally cause the pressure level within the pilot manifold 122 to drop below the pressure level within the reservoir 144. This coupled with the fact that the pressure forces across the piston 146 then become unbalanced will cause fluid stored in the reservoir 144 to be discharged to the pilot manifold 122 for use in actuating the valves 30, 32, 34 and 36.

Figure 7B:
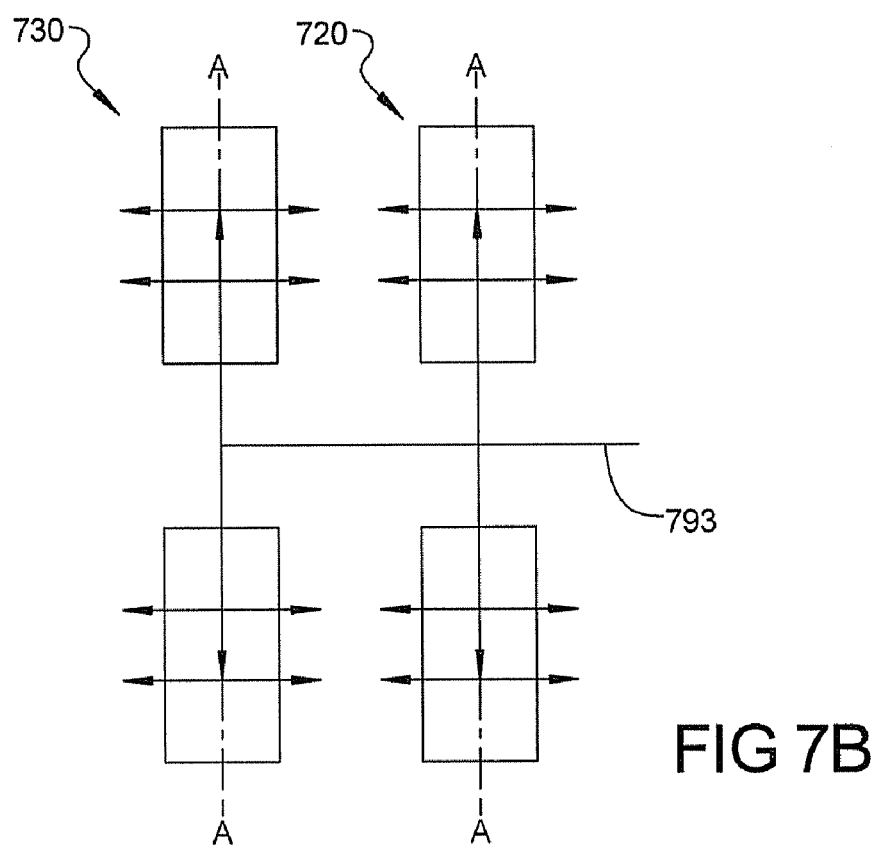
FIG. 7B is a schematic illustration of the co-axial valve configuration in FIG. 7A.
Figure 4:
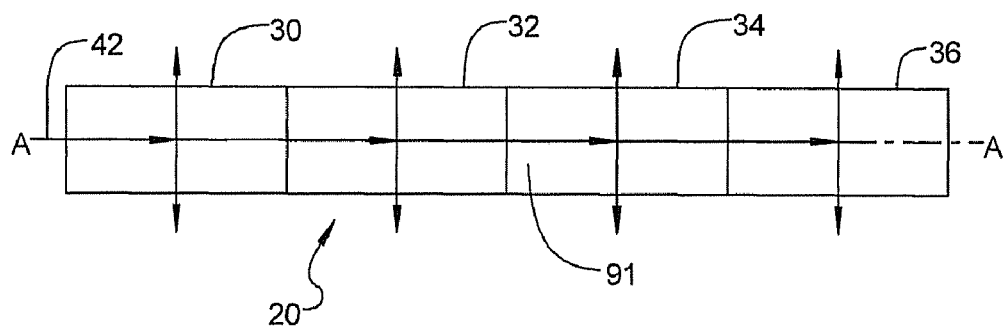
FIG. 4 is a schematic illustration of the collinear valve configuration in FIG. 1A.
Figure 5:
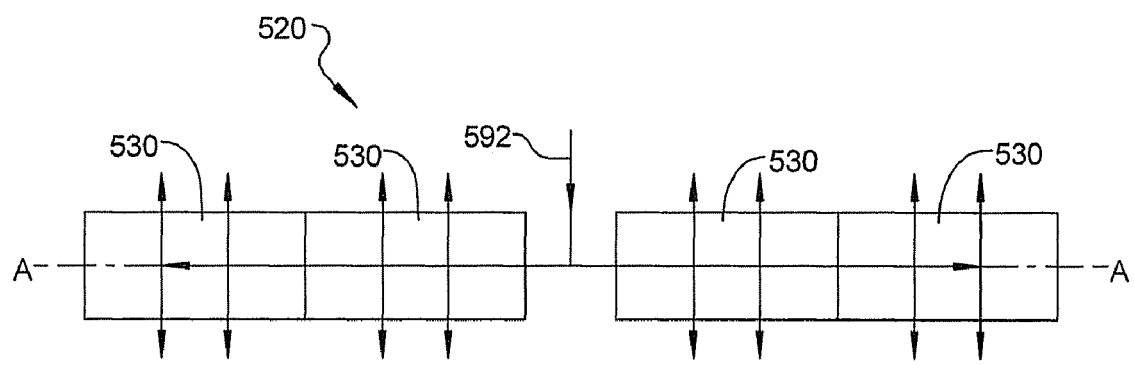
FIG. 5 is a schematic representation of an exemplary main-stage manifold employing multiple main-stage valves arranged in a split collinear configuration.

The valves 30, 32, 34 and 36 may be arranged within the manifold 20 in various configurations. Examples of various valve arrangements are described below, including but not limited to a co-parallel configuration, as shown in FIGS. 2A and 2B; a radial configuration, as shown in FIGS. 3A and 3B; a collinear configuration, as shown in FIGS. 1A and 4; a split collinear configuration, as shown in FIG. 5; an annular configuration, as shown in FIGS. 6A and 6B; and a two by two (2×2) co-axial configuration, as shown in FIGS. 7A and 7B. The figures depicting the various valve arrangements each include a cross-sectional view of the manifold 20 depicting the arrangement of the main-stage valve and one or more schematic illustrations of the manifold 20 illustrating the manner in which the fluid passes through the main-stage manifold and individual main-stage valves (except for the split collinear arrangement shown in FIG. 5). These are merely a few of the possible valve arrangements; in practice other arrangements may also be employed depending on the requirements of a particular application. The exemplary valve arrangements are not intended to be in any way limiting, as other arrangements may also be utilized.

Referring to FIG. 2A, manifold 220 includes two or more valves 230 arranged in a co-parallel configuration, wherein a longitudinal axis A-A of the valves 230 are aligned substantially parallel to one another. A spool 266 and a sleeve 264 of each valve 230 may be arranged such that the spool 266 (moveable member) is the outer member and the sleeve 264 (stationary member) is the inner member. The valve 230 may also be configured such that the outer member operates as the sleeve 264 and the inner member operates as the spool 266. The path of travel of the spool 266 of each of the valves 230, which generally coincides with a longitudinal axis of the valve, may be aligned substantially parallel to one another. The path of travel between the spools 266 may lie substantially within a common plane. The valves 230 may be arranged on a common side of a manifold supply passage 222.

Turning also to FIG. 2B, an inlet 292 of each valve 230 may be fluidly connected to the manifold supply passage 222. Pressurized fluid enters the manifold supply passage 222 through an inlet 242 fluidly connected to a pressure source. The fluid passes through the manifold supply passage 222 to the inlet 292 of the respective valves 230. Actuating (i.e., opening) one or more of the valves 230 allows pressurized fluid to pass from the manifold supply passage 222 to an inner cavity 232 of the spool 266 of the valve 230. From that point the fluid passes radially outwardly through orifices 280 in the sleeve 264 and orifices 282 in the spool 266, and may be subsequently directed through a corresponding hydraulic circuit to a hydraulic load. In addition to providing certain performance benefits, the co-parallel valve arrangement may also reduce manufacturing costs by simplifying machining and assembly operations. This particular arrangement also enables the manifold 220 to be readily modified to include any number of valves depending on the requirements of the particular application.

Referring to FIGS. 3A and 3B, a manifold 320 may include two or more valves 330 arranged in a radial configuration, where the valves 330 may be arranged in a generally circular pattern around an axis A-A of a common fluid node 342. The manifold 320 may include a series of supply passages 391 that extend radially outwardly from the common fluid node 342 in a manner resembling the spokes of a wheel, for example, as shown in FIG. 3B. An inlet port 392 of the valves 330 are fluidly connected to a supply passage 391. A spool 366 and a sleeve 364 of each valve 330 may be arranged such that the spool 366 (moveable member) is the outer member and the sleeve 364 (stationary member) is the inner member, although the valve 330 may be configured such that the functions are reversed. Pressurized fluid may enter the supply passage 391 through an inlet port 393 that may be fluidly connected to a pressure source. Fluid passes through the supply passage 391 to the inlet passages of the respective valves 330. Actuating (i.e., opening) one or more of the valves 330 allows pressurized fluid to pass radially outward through the orifices 380 in the sleeve 364 and the orifices 382 in the spool 366, and subsequently through a corresponding hydraulic circuit to a hydraulic load.

Referring to FIGS. 1A and 4, the valves 30, 32, 34, 36 are shown arranged in a collinear configuration in the manifold 20, wherein the sleeves 64 of the valves 30, 32, 34, 36 are arranged end-to-end along a common longitudinal axis A-A. FIG. 4 is a schematic illustration of the manifold of FIG. 1A, showing the fluid path through the manifold. The spool 66 and the sleeve 64 of each valve 30, 32, 34, 36 are arranged such that the spool 66 (moveable member) is the outer member and the sleeve 64 (stationary member) is the inner member. In this configuration the sleeves 64 are connected together along the common longitudinal axis A-A to form a continuous cylindrical supply passage 91. Pressurized fluid enters the supply passage through the inlet port 42 fluidly connected to a pressure source. Actuating (i.e., opening) one or more of the valves 30, 32, 34, 36 allows pressurized fluid to pass radially outward through the orifices 80 in the spool 66 and the orifices 82 in the sleeve 64 to an interconnected hydraulic circuit for supplying a hydraulic load. Fluid delivered to a particular valve passes through the sleeve 64 of each of the preceding valves prior to being delivered to the particular valve. For example, fluid delivered to the last valve 36 in the series passes through the sleeve 64 of each of the preceding valves 30, 32 and 34. The collinear valve arrangement minimizes the main-stage inlet volume, which in turn may improve the overall operating efficiency of the hydraulic system. The path of travel of the spool 66 of each of the valves 30 may be aligned substantially parallel to one another, wherein the path of travel between the spools 66 may extend substantially along a common axis. The valves 30, 32, 34 and 36 may each have a common longitudinal axis A-A that may be arranged substantially parallel to the path of travel of the spools 66. The longitudinal axis A-A may be a common axis shared by all the valves 30, 32, 34 and 36, in the manifold 20. The supply passage 91 may substantially coincide with the axis A-A of the valves.

The exemplary valve arrangement depicted in FIG. 5 is a schematic view of a modified version of the collinear valve arrangement illustrated in FIG. 4 that includes a manifold 520. This arrangement, referred to as a split co-linear configuration, may include four valves 530 separated into two pairs arranged on opposite sides of a supply passage 592. Each pair of valves 530 are arranged end-to-end in the manner described above with respect to the co-linear arrangement. Pressurized fluid is supplied to each pair of valves 530 through the supply passage 592. The pressurized fluid may pass through each pair of valves 530 as previously described with respect to the collinear valve arrangement, as shown in FIGS. 1A and 4. It shall be appreciated that each set of valves 530 may include fewer or more than two valves 530. The path of travel of the spool of each of the valves 530 may be aligned substantially parallel to one another. The path of travel of the spools may substantially extend along a common axis. For example, the valves 530 may be arranged along a common longitudinal axis A-A that extends substantially parallel to the path of travel of the spools, such that the longitudinal axis A-A is a common axis shared by all the valves 530 in the manifold 520.

Referring to FIGS. 6A and 6B, a manifold 620 may include two or more valves 630 arranged in an annular configuration similar to the arrangement shown in FIGS. 3A and 3B. The valves 630 may be arranged in a generally circular pattern around an axis A-A of an annular plenum 693. The main-stage manifold 620 includes an inlet port 692 that may be fluidly connected to a pressure supply. The inlet port 692 delivers pressurized fluid to the annular plenum 693. The valves 630 are arranged around and fluidly connected to the annular plenum 693. The spool 666 and sleeve 664 of each valve 630 are arranged such that the spool 666 (moveable member) is the outer member and the sleeve 664 (stationary member) is the inner member. It shall be appreciated, however, that the valve 630 may also be configured such that the outer member operates as the sleeve 664 and the inner member operates as the spool 666. Pressurized fluid enters the inlet port 692 connected to a pressure source. The fluid passes through the inlet port 692 to the annular plenum 693. Upon actuating (i.e., opening) one or more of the valves 630 the pressurized fluid flows from the annular plenum 693 through the valves 630 to an exit port 644. In contrast to the previously described valve arrangements, the pressurized fluid passes radially inward through the orifices in the spool 666 and the sleeve 664 to the interior of the sleeve 664. The interior of the sleeve 664 may be fluidly connected to the exit port 644 of the valve 630. The exit ports 644 may be fluidly connected to a hydraulic load.

Referring to FIGS. 7A and 7B, a manifold 720 may include multiple valves 730 arranged in a two by two (2×2) co-axial arrangement similar to the arrangement depicted in FIGS. 2A and 2B. This configuration may include two sets of valves 730 arranged on opposite sides of a common manifold supply passage 793. A longitudinal axis A-A of the valves 730 of a given set are aligned generally parallel to one another. A spool 766 and sleeve 764 of each valve 730 are arranged such that the spool 766 (moveable member) is the inner member and the sleeve 764 (stationary member) is the outer member. It shall be appreciated, however, that the valve 730 may also be configured such that the inner member operates as the sleeve 764 and the outer member operates as the spool 766. An inlet 791 of each valve 730 is fluidly connected to the manifold supply passage 793. Pressurized fluid enters the manifold supply passage 793 through an inlet port 792 fluidly connected to a pressure source. The fluid passes through the manifold supply passage 793 to the inlet passage 791 of the respective valves 730. Actuating (i.e., opening) one or more of the valves 730 allows pressurized fluid to pass from the manifold supply passage 793 to an inner cavity 732 of the spool 766. From that point the fluid passes radially outward through the orifices 780 in the spool 766 and the orifices 782 in the sleeve 764 and may be subsequently directed through a corresponding hydraulic circuit to a hydraulic load. The path of travel of the spool 766 of each of the valves 730 may be aligned substantially parallel to at least one other valve 730 and may lie substantially within a common plane with at least one other valve 730. Each of the valves 730 may share a common longitudinal axis A-A with at least one other valve 730.

Figure 8:
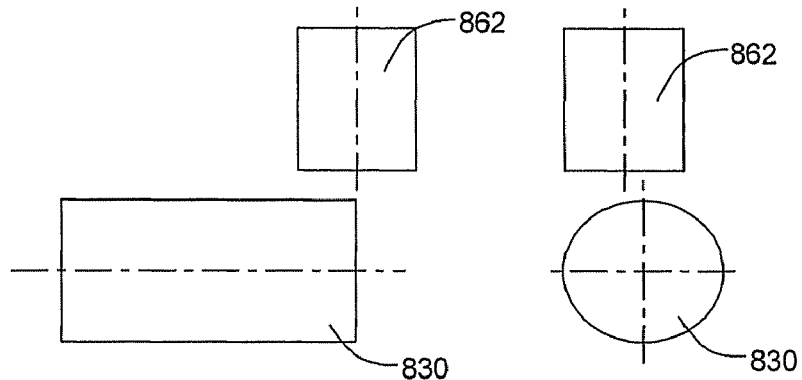
FIG. 8 is a schematic representation of a valve assembly having a pilot valve arranged externally along a longitudinal side of the main-stage valve.
Figure 9:
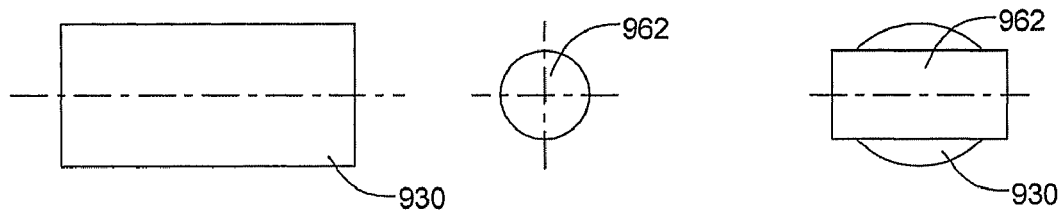
FIG. 9 is a schematic representation of a valve assembly having a pilot valve arranged externally adjacent an end of the main-stage valve.
Figure 10:
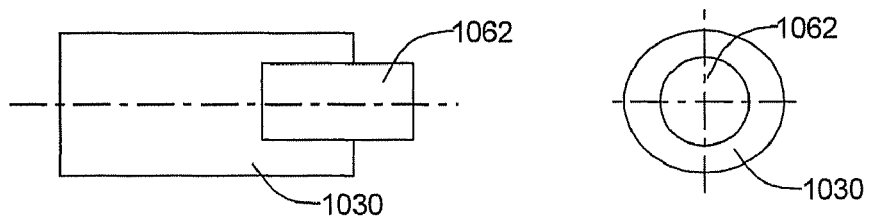
FIG. 10 is a schematic representation of a valve assembly having a pilot valve arranged internally to the main-stage valve.

Various options exist for mounting the pilot valve to the main-stage valve. Three exemplary pilot valve mounting options are schematically depicted in FIGS. 8-10. For example, the pilot valve 862 may be mounted externally to a side of the associated main-stage valve 830, as shown in FIG. 8. This arrangement is similar to the main-stage valve and pilot valve arrangement shown in FIG. 1. The pilot valve 962 may also be mounted externally to an end of the main-stage valve 930, as shown in FIG. 9. The pilot valve 1062 may also be at least partially integrated internally within the main-stage valve 1030, as shown in FIG. 10.

The valve arrangements illustrated in FIGS. 1A-10, may employ various actuating schemes. An example of one such arrangement for actuating the valves is illustrated schematically in FIG. 11. This arrangement utilizes a pilot valve 1162 and a biasing member, such as return spring 1106, for controlling the actuation of each main-stage valve 1130. Return spring 1106 may have any of a variety of configurations, including but not limited to, a coil spring and a leaf spring. Separate pressure sources, such as pumps 1133 and 1135, may be provided for supplying a flow of pressurized fluid to the pilot valve 1162 and the main-stage valves 1130, respectively. A pressure regulator may be provided to control a discharge pressure of the pressure sources. It shall be appreciated, however, that the pilot valves 1162 and the main-stage valves 1130 may also utilize a common pressure source. An example of an integrated pilot valve 1162 and main-stage valve manifold configured to utilize a common pressure source is illustrated in FIGS. 1A, 2A, and 3A.

Figure 11:
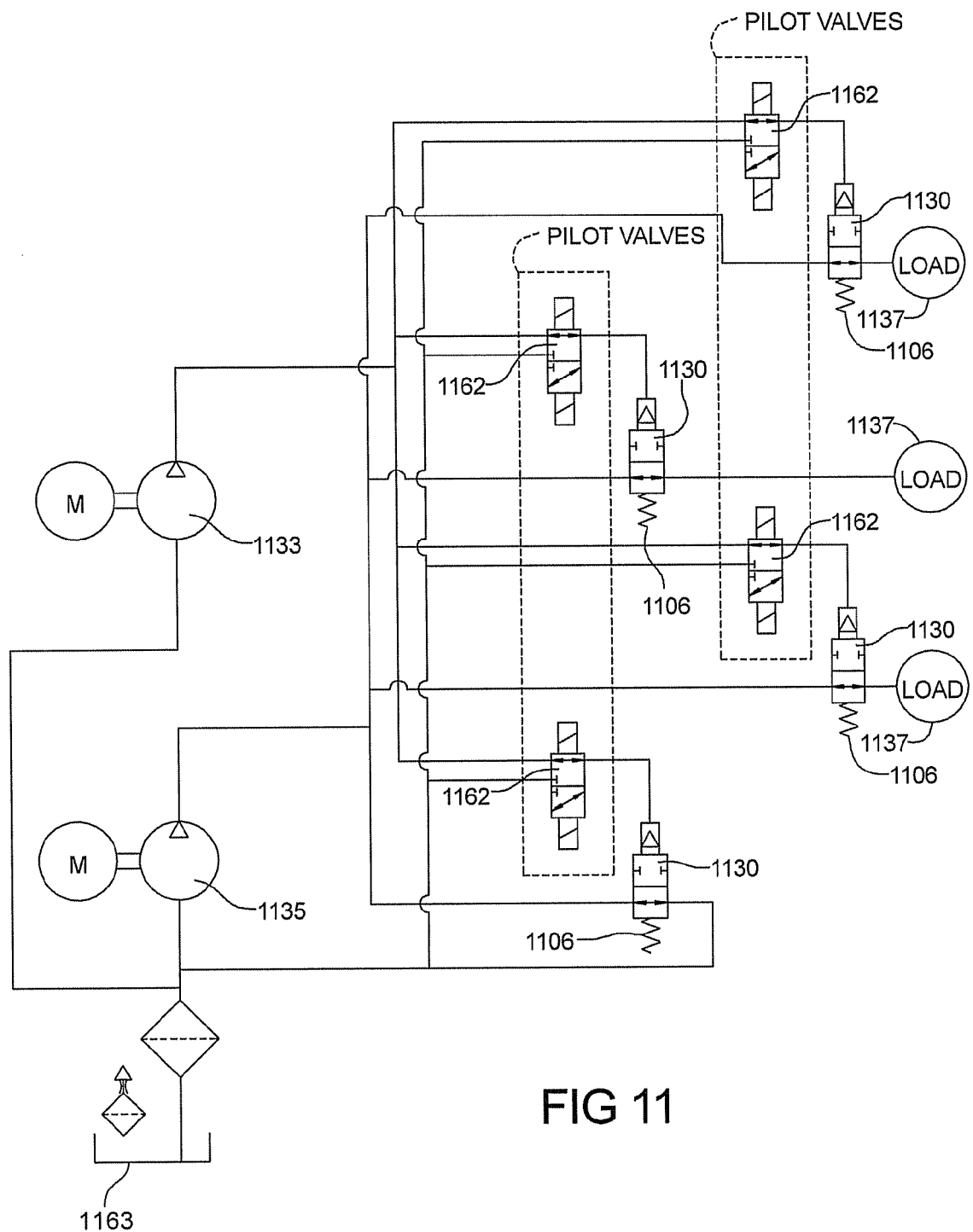
FIG. 11 is a schematic representation of an exemplary hydraulic system including multiple main-stage valves, each employing a pilot valve for opening the main-stage valve and a return spring for closing the main-stage valve.

Continuing to refer to FIG. 11, operation of the main-stage valve may be controlled by the pilot valve 1162 and the return spring 1106. In one example, the pilot valve 1162 may be actuated by one or more solenoids. The solenoids may include a coil, which when energized moves the pilot valve 1162 between an open position and a dump position. Arranging the pilot valve 1162 in the open position allows pressurized fluid from the pump 1133 to flow through the pilot valve 1162 to the main-stage valve 1130. The pressurized fluid from the pilot valve 1162 causes the spool of the main-stage valve 1130 to move to the open position (such as previously described with respect to FIG. 1A), thereby allowing pressurized fluid to flow from the pump 1135 through the valve 1130 to a hydraulic load 1137. Arranging the pilot valve 1162 in the dump position causes the pilot valve to stop the flow of pressurized fluid used to open the valve 1130 and fluidly connects the pilot valve to a low pressure reservoir 1163. This allows the biasing force of the return spring 1106 to move the spool of the main-stage valve 1130 back to the closed position, thereby blocking the flow of pressurized fluid to the hydraulic load 1137.

Utilizing a return spring 1106 to return the main-stage spool to the closed position has the advantage of providing a failsafe mechanism in the event there is a drop in system pressure. If that occurs, the return spring 1106 will operate to close the valve 1130.

The return spring 1106 can be sized to achieve a desired balance between the main-stage valve opening and closing response times. Increasing or decreasing the spring rate of the return spring 1106 may affect the opening and closing response times differently. For example, increasing the spring rate will generally result in a corresponding decrease in the closing response time and a corresponding increase in the opening response time for a given supply pressure. The corresponding increase in the opening response time is due to the fact that the biasing force of the return spring 1106 tends to resist the motion of the pilot controlled actuation force. The corresponding increase in opening response time may be overcome, for instance, by increasing the pressure used to activate the main-stage valve 1130, although doing so may not always be a viable alternative. Conversely, decreasing the spring rate of the return spring 1106 will generally result in a corresponding increase in the closing response time and a corresponding decrease in the opening response time. Accordingly, the sizing of the return spring 1106 may depend on various factors, including but not limited to the magnitude of the pilot controlled actuation force as well as the desired valve opening and closing response times required for a particular application.

Figure 12:
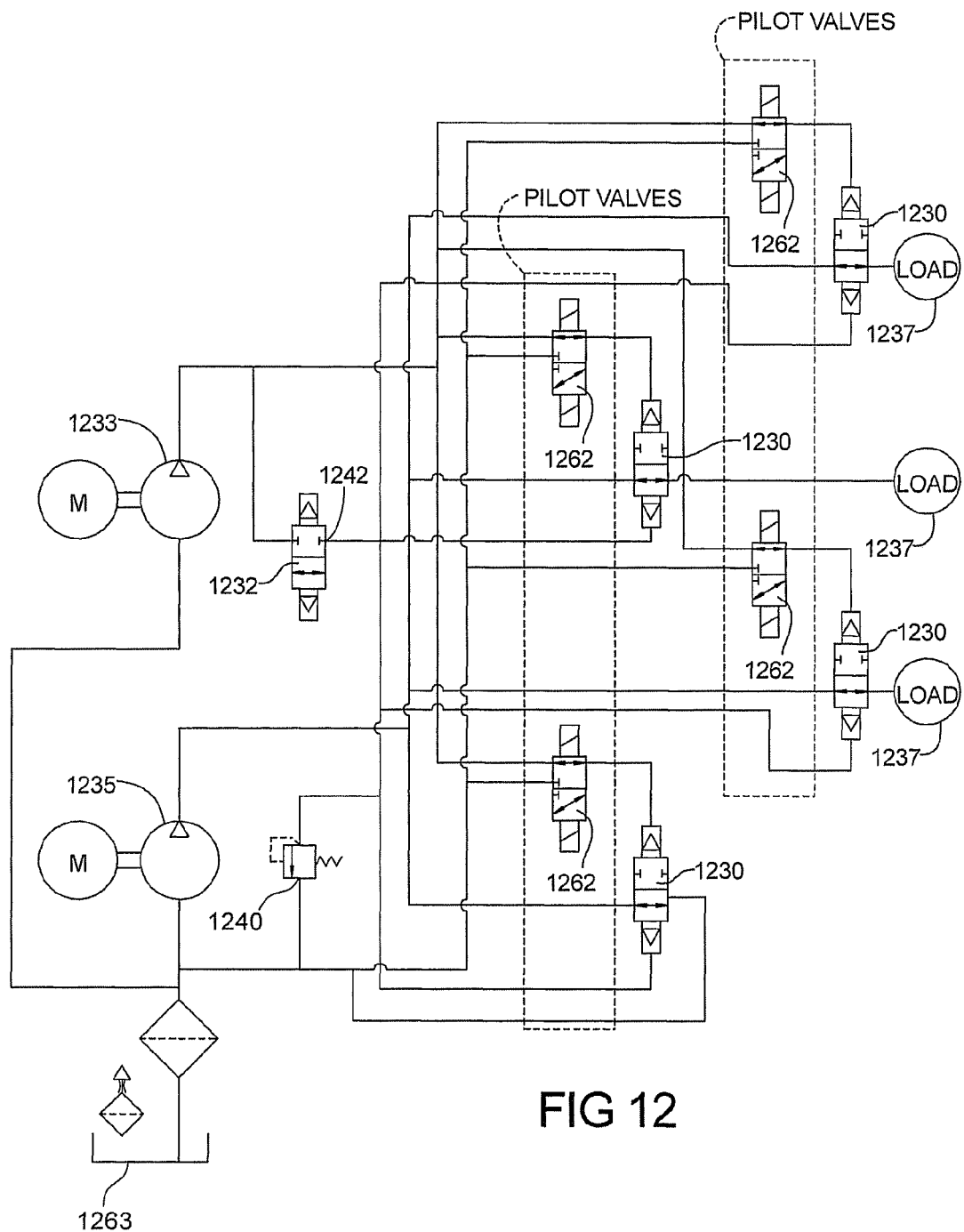
FIG. 12 is a schematic representation of an exemplary hydraulic system including multiple main-stage valves, each employing a pilot valve for opening the main-stage valve and a shared return pressure valve for closing the main-stage valves.

With reference to FIG. 12, the main-stage valve actuating scheme illustrated in FIG. 11 may be modified by eliminating the main-stage return springs 1106, and instead using hydraulic pressure to close the main-stage valves 1230. The return pressure used to close the main-stage valves 1230 may be controlled by way of a single return pressure valve 1232. This arrangement utilizes a common pressure source, illustrated as pump 1233. A pressure regulator may be provided to control a discharge pressure of the pressure sources. The pump 1233 may be used to supply the necessary pressure for opening and closing the main-stage valves 1230. The closing response time for this configuration is generally proportional to the pressure output of the return pressure valve 1232. Increasing the output pressure of the return pressure valve 1232 will generally produce a corresponding decrease in the valve 1230 closing response time, whereas decreasing the output pressure will generally result in a corresponding increase in the response time. The return pressure valve 1232 may be configured to produce a minimum output pressure greater than the pressure required to drain the fluid from the pilot valves 1262 so as to provide sufficient pressure to move the spool of the main-stage valve 1230 to the closed position within a desired response time. A pressure regulator 1240 may be provided for controlling the pressure supplied to the main-stage valve 1230 from pilot valve 1232. The pressure regulator controls the pressure discharged from pilot valve 1232 by selectively fluidly connecting a discharge port 1242 of pilot valve 1232 to a low pressure reservoir 1263. The pressure regulator allows at least a portion of the pressurized fluid discharged from the pilot valve 1232 to be directed back to the reservoir 1263 when the pilot valve discharge pressure exceeds a predetermined pressure. Separate pressure sources, such as pumps 1233 and 1235, may be provided for supplying a flow of pressurized fluid to the pilot valve 1262 and the main-stage valves 1230, respectively. The pilot valves 1262 and the main-stage valves 1230 may also utilize a common pressure source, such as illustrated in FIGS. 1A, 2A, and 3A.

Operation of the main-stage valves 1230 are controlled by the pilot valves 1262 and the single return pressure valve 1232. In one example, the pilot valve 1262 may be actuated by one or more solenoids. Each solenoid may include a coil, which when energized urges the pilot valve 1262 to move between an open position and a closed position. When arranged in the open position, the pilot valve 1262 allows pressurized fluid from the pump 1233 to flow through the pilot valve 1262 to the main-stage valve 1230. The pressurized fluid from the pilot valve 1262 causes a spool of the main-stage valve 1230 to move to the open position (for example, in the manner described with respect to FIG. 1A), thereby allowing pressurized fluid to flow from the pump 1235 through the main-stage valve 1230 to a hydraulic load 1237. Arranging the pilot valve 1262 in the closed position stops the flow of pressurized fluid used to open the main-stage valve 1230. The single return pressure valve 1232 may be used to control the pressure needed to move the spool of the main-stage valve 1230 back to the closed position, thereby blocking the flow of pressurized fluid to the hydraulic load 1237.

Continuing to refer to FIG. 12, although this arrangement does not utilize a return spring to move the main-stage spool to the closed position, a return spring may nevertheless be employed to provide a failsafe mechanism for closing the main-stage valves 1230 in the event of a loss or drop in system pressure. Since the return spring is not being utilized as the primary means for returning the main-stage spool to the closed position, the spring rate of the return spring can be significantly lower than may otherwise be required if a pressure source were not applying pressure to close the main-stage valves 1230.

Figure 13:
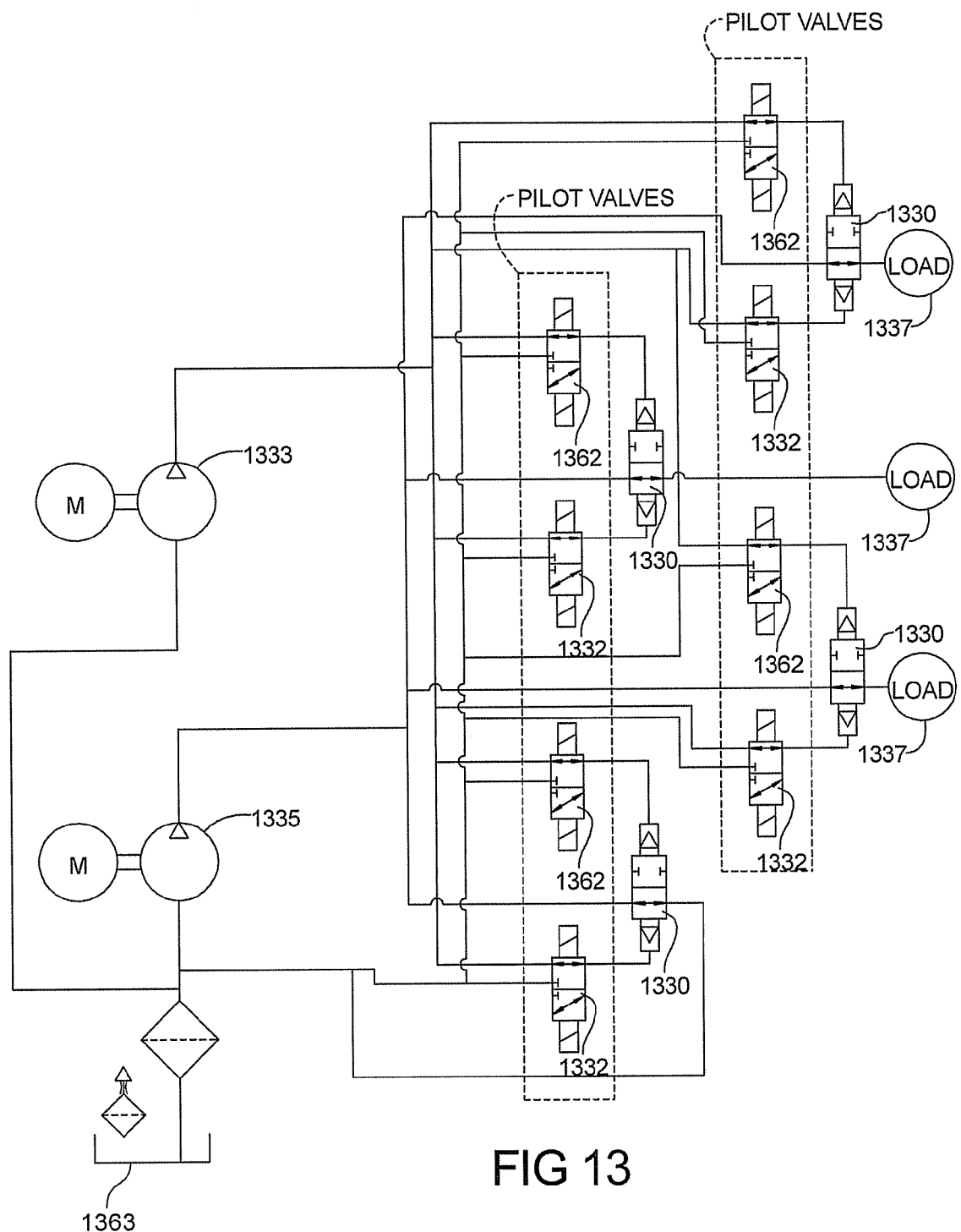
FIG. 13 is a schematic representation of an exemplary hydraulic system including multiple main-stage valves, each employing a pilot valve for opening the main-stage valve and a pilot valve for closing the main-stage valve.

FIG. 13 illustrates a main-stage valve control scheme similar to that shown in FIG. 12. As is the case with the configuration shown in FIG. 12, hydraulic pressure, rather than a return spring, is used to close the main-stage valves 1330. But in contrast to the configuration shown in FIG. 12, this configuration utilizes separate pilot valves 1332, rather than a single return pressure valve (i.e., valve 1232 in FIG. 12), to control the pressure delivered to the main-stage valves 1330 for closing the valves. Each main-stage valve 1330 may thus employ two separate pilot valves 1332 and 1362. The pilot valve 1362 controls the opening of the main-stage valve 1330 and the other pilot valve 1332 controls the closing of the main-stage valve 1330. Although this arrangement does not utilize a return spring to move the main-stage spool to the closed position, a return spring may nevertheless be employed to provide a failsafe mechanism for closing the main-stage valve 1330 in the event of a loss or drop in system pressure. Since the return spring is not being utilized as the primary means for returning the main-stage spool to the closed position, the spring rate of the return spring can be significantly lower than may otherwise be required if a pressure source were not applying pressure to close the main-stage valve 1330. Separate pressure sources, such as pumps 1333 and 1335, may be provided for supplying a flow of pressurized fluid to the pilot valves 1332 and 1362, as well as the valves 1330, respectively. A pressure regulator may be provided to control a discharge pressure of the pressure sources. It shall be appreciated, however, that the pilot valves 1332 and 1362 as well as the main-stage valves 1330 may also utilize a common pressure source, as illustrated in FIGS. 1A, 2A, and 3A.

Operation of the main-stage valve 1330 is controlled by the pilot valves 1332 and 1362. In one example, the pilot valves 1332 and 1362 may be actuated by one or more solenoids. The solenoids may include a coil, which when energized urges the pilot valves 1332 and 1362 to move between an open position and a dump position. When arranged in the open position, the pilot valve 1362 allows pressurized fluid from the pump 1333 to flow through the pilot valve 1362 to the main-stage valve 1330. The pressurized fluid from the pilot valve 1362 causes a spool of the main-stage valve 1330 to move to the open position, thereby allowing pressurized fluid to flow from the pump 1335 through the main-stage valve 1330 to a hydraulic load 1337. Arranging the pilot valve 1362 in the dump position stops the flow of pressurized fluid used to open the main-stage valve 1330 and fluidly connects the pilot valve 1362 with a reservoir 1363. With pilot valve 1362 arranged in the dump position, the pilot valve 1332 may then be opened to supply the pressure needed to move the spool of the main-stage valve 1330 back to the closed position, thereby blocking the flow of pressurized fluid to the hydraulic load 1337.

Figure 14:
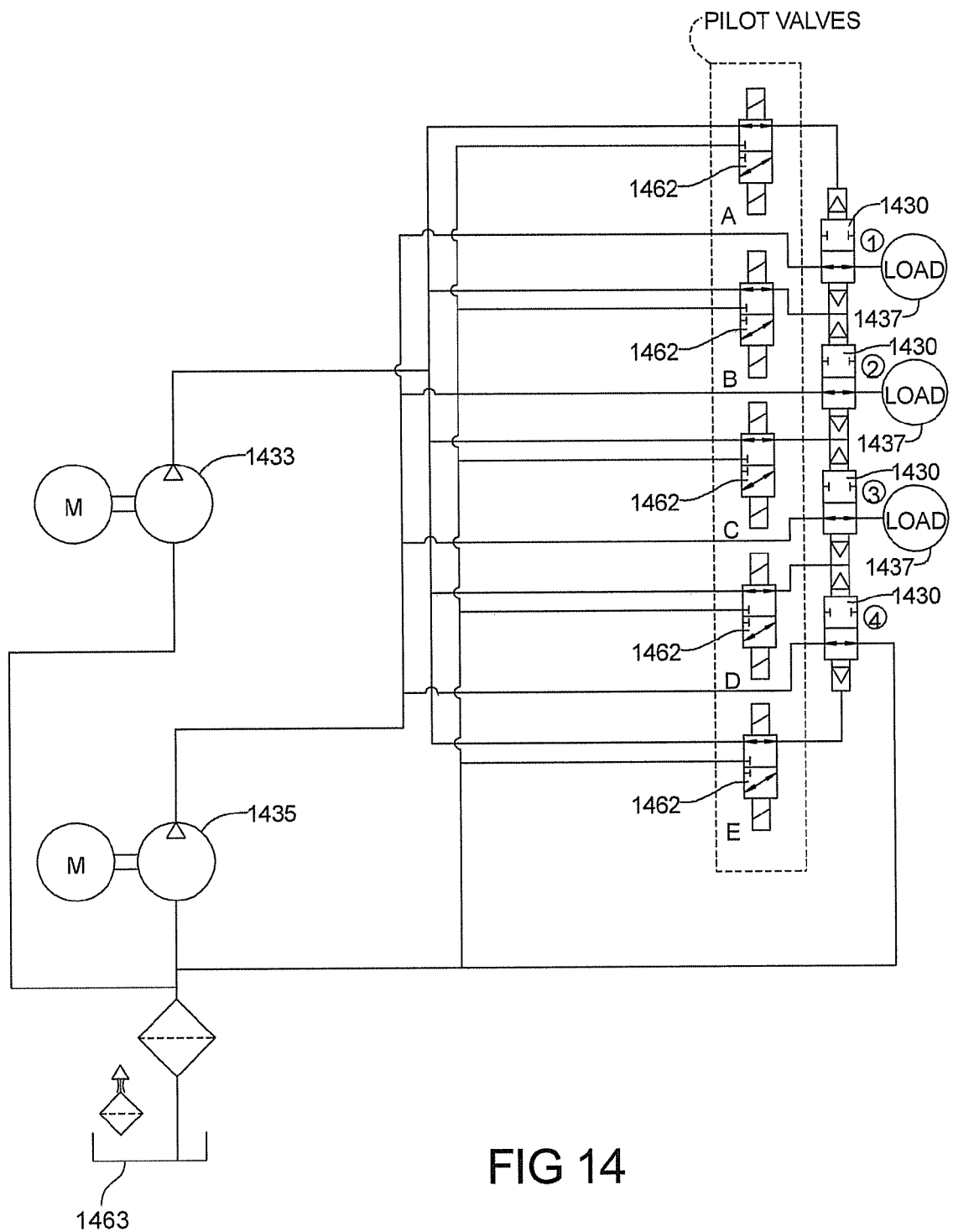
FIG. 14 is a schematic representation of an exemplary hydraulic system including multiple main-stage valves employing multiple pilot valves for opening and closing the main-stage valves.

FIG. 14 schematically illustrates a main-stage valve actuating scheme that takes advantage of the combined actuating areas of adjacent main-stage valve spools 1430 to minimize the number of pilot valves 1462 that may be required to open and close the main-stage valves 1430. Separate pressure sources, such as pumps 1433 and 1435, may be provided for supplying a flow of pressurized fluid to the pilot valves 1462 and the main-stage valves 1430, respectively. A pressure regulator may be provided to control a discharge pressure of the pressure sources. It shall be appreciated, however, that the pilot valves 1462, as well as the main-stage valves 1430, may also utilize a common pressure source, such as illustrated in FIGS. 1A, 2A, and 3A, for example. Each main-stage valve 1430 may employ two separate pilot valves 1462. One pilot valve 1462 operates to open the main-stage valve 1430 and the other pilot valve 1462 operates to close the main-stage valve 1430. The main-stage valves 1430 located at the ends of the valve series share a pilot valve 1462 with the adjacent main-stage valve 1430. For example, main-stage valve (1) (the four main-stage valves 1430 in FIG. 14 are individually identified as valves (1)-(4)) will share pilot valve B (the five pilot valves 1462 in FIG. 14 are individually identified as valves A-E) with adjacent main-stage valve (2), and main-stage valve (4) will share pilot valve D with adjacent main-stage valve (3). The valves 1430 located in the middle of the valve series will share two pilot valves 1462. For example, main-stage valve (2) shares pilot valve B with adjacent main-stage valve (1) and pilot valve C with adjacent main-stage valve (3).

The pilot valves 1462 may be actuated by one or more solenoids. The solenoids may include a coil, which when energized may urge the pilot valve 1462 to move between an open position and a dump position. When placed in the open position, the pilot valve 1462 allows pressurized fluid from a pump 1433 to flow through the pilot valve 1462 to the main-stage valve 1430. Arranging the pilot valve 1462 in the dump position fluidly connects the pilot valve to a low pressure reservoir 1463. Shared pilot valves 1462 may operate to simultaneously apply an opening pressure to one of the shared valves 1430 and closing pressure to the other of the shared valves 1430. For example, arranging the pilot valve B in the open position allows pressurized fluid from a pump 1433 to flow through the pilot valve B to the main-stage valve (2). With the pilot valves A and C arranged in the dump position, the pressurized fluid from the pilot valve B causes the spool of the main-stage valve (2) to move to the open position, thereby allowing pressurized fluid to flow from the pump 1433 through the main-stage valve (2) to a hydraulic load 1437. Arranging the pilot valve B in the open position simultaneously applies a closing pressure to the main-stage valve (1). The main-stage valves may also be configured such that the shared pilot valves 1462 operate to simultaneously apply an opening pressure to both shared main-stage valves 1430 or a closing pressure to both shared main-stage valves 1430. For example, opening pilot valve B may simultaneously apply a closing pressure to both main-stage valve (1) and main-stage valve (2). This arrangement may minimize the number of pilot valves 1462 by using a single pilot valve 1462 to control the operation of two main-stage valves 1430.

A logic table identifying various control schemes for opening and closing each of the main-stage valves 1430 of FIG. 14 is provided in Table 1 of FIG. 15. The table describes the effect that various pilot valve operating conditions have on the operation of the corresponding main-stage valve. For example, opening pilot valve A to pressure (valve position "1") will open main-stage valve (1) (valve position "1"). This will not have an effect on the position of the remaining three main-stage valves, which will maintain their previous positions (valve position "LC"), provided that the remaining pilot valves are opened to drain (valve position "0"). Opening pilot valve B (valve position "1"), which is shared by main-stage valves (1) and (2), and opening pilot valve A to drain (valve position "0") will result in main-stage valve (1) closing (valve position "0") and main-stage valve (2) opening (valve position "1"). Main-stage valves 3 and 4 will maintain their previous positions (valve position "LC") provided that the associated pilot valves are open to drain. The effect that opening the other pilot valves (i.e., pilot valves C, D and E) has on the operation of the main-stage valves can be readily determined from Table 1 of FIG. 15.

Figure 16:
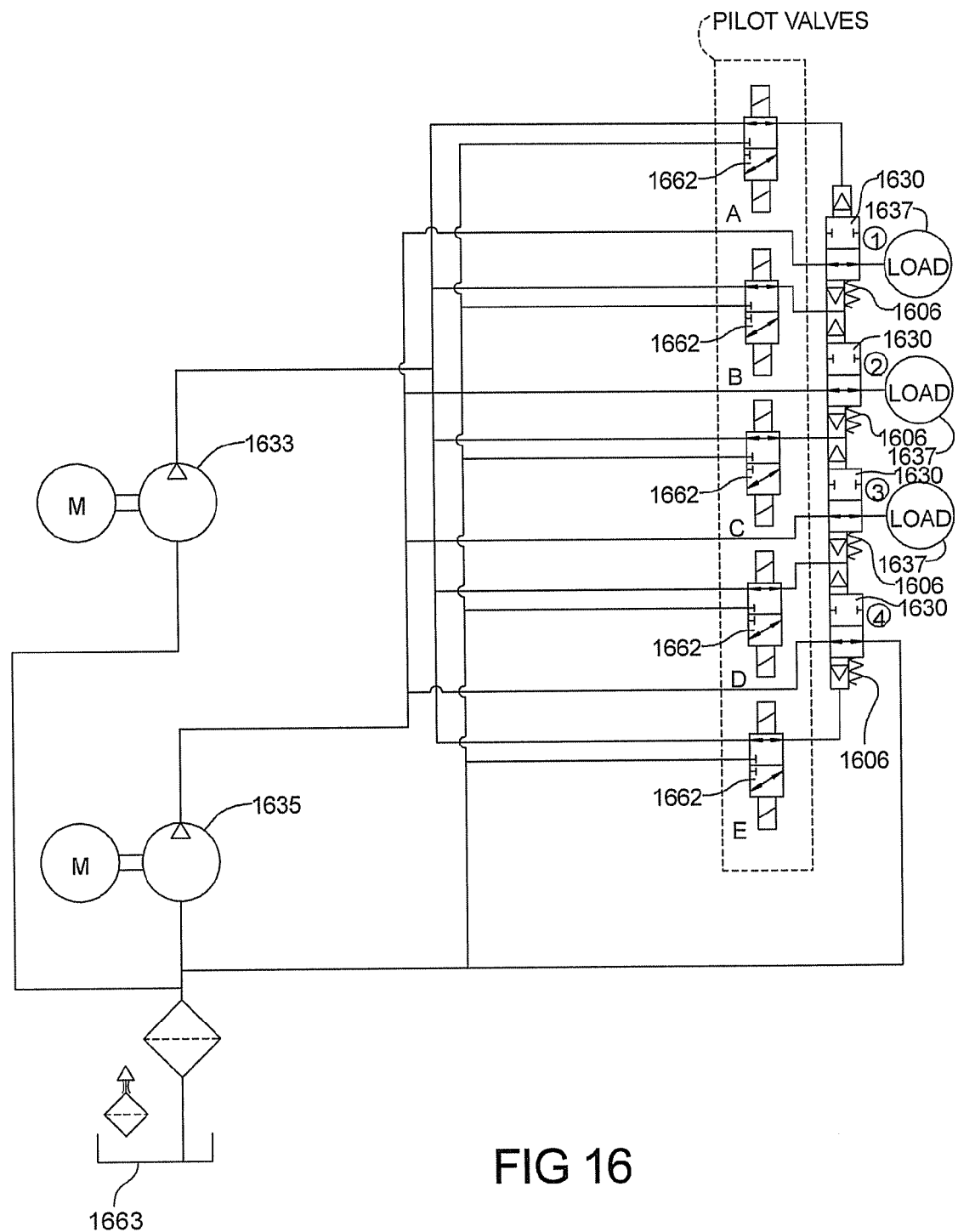
FIG. 16 is a schematic representation of the exemplary hydraulic system of FIG. 14 employing a biasing member for preloading the main-stage spool to a closed position.

FIG. 16 schematically illustrates a main-stage valve actuating scheme similar to that shown in FIG. 14. A difference is the addition of a biasing member 1606 that operates to preload a spool of the main-stage valve 1630 to a closed position. The biasing member 1606 also provides a failsafe mechanism for closing the main-stage valve 1630 in the event of a loss or reduction in system pressure. The biasing member 1606 may also minimize feedback effects due to pressure changes that may occur when adjacent main-stage valves 1630 are actuated.

Separate pressure sources, such as pumps 1633 and 1635, may be provided for supplying a flow of pressurized fluid to pilot valves 1662 and main-stage valves 1630, respectively. A pressure regulator may be provided to control a discharge pressure of the pressure sources. The pilot valves 1662, as well as the main-stage valves 1630, may also utilize a common pressure source, such as illustrated in FIGS. 1A, 2A, and 3A, for example. Each main-stage valve 1630 (the four main-stage valves are individually identified as valves (1)-(4) in FIG. 16) may employ two separate pilot valves 1662 (the five pilot valves are individually identified as valve A-E in FIG. 16). One pilot valve 1662 operates to open the main-stage valve 1630 and the other pilot valve 1662 operates to close the main-stage valve 1630. The main-stage valves 1630 located at the ends of the valve series will share a pilot valve 1662 with the adjacent main-stage valve 1630. For example, main-stage valve (1) will share pilot valve B with adjacent main-stage valve (2), and main-stage valve (4) will share pilot valve E with adjacent main-stage valve (3). The main-stage valves 1630 located in the middle of the valve series will share two pilot valves 1662. For example, main-stage valve (2) shares pilot valve B with adjacent main-stage valve (1) and pilot valve C with adjacent main-stage valve (3).

The pilot valves 1662 may be actuated by one or more solenoids. The solenoids may include a coil, which when energized may urge the pilot valve 1662 to move between an open position and a dump position. When placed in the open position, the pilot valve 1662 allows pressurized fluid from a pump 1633 to flow through the pilot valve 1662 to the main-stage valve 1630. Arranging the pilot valve 1662 in the dump position fluidly connects the pilot valve to a low pressure reservoir 1663. Shared pilot valves 1662 operate to simultaneously apply an opening pressure to one of the shared main-stage valves 1630 and closing pressure to the other of the shared main-stage valves 1630. For example, arranging the pilot valve B in the open position allows pressurized fluid from the pump 1633 to flow through the pilot valve B to the main-stage valve (2). With the pilot valves A and C arranged in the dump position, the pressurized fluid from the pilot valve B causes the spool of the main-stage valve (2) to move to the open position, thereby allowing pressurized fluid to flow from the pump 1633 through the main-stage valve (2) to a hydraulic load 1637. Arranging the pilot valve B in the open position simultaneously applies a closing pressure to main-stage valve (1). The biasing member 1606 provides a failsafe mechanism for closing the main-stage valve 1630 in the event of a loss or reduction in system pressure. The main-stage valves may also be configured such that the shared pilot valves 1662 operate to simultaneously apply an opening pressure to both shared main-stage valves or a closing pressure to both shared main-stage valves 1662. For example, opening pilot valve B may simultaneously apply a closing pressure to both main-stage valve (1) and main-stage valve (2). This arrangement may minimize the number of pilot valves 1662 by using a single pilot valve 1662 to control the operation of two main-stage valves 1630.

Exemplary control logic for controlling the opening and closing of the main-stage valves 1630 employed in the control scheme shown in FIG. 16 is provided in the Table 2 of FIG. 17. For example, if pilot valve A is open to pressure (valve position "1" in Table 2) and pilot valves B-E are open to drain (valve position "0" in Table 2), this will result in main-stage valve (1) opening (valve position "1" in Table 2) and the remaining main-stage valves 1630 remaining closed (valve position "0" in Table 2). The effect of various other pilot valve operating sequences may be readily determined from Table 2 of FIG. 17.

Table 3 of FIGS. 18A and 18B describes exemplary control logic that may be employed with the control scheme shown in FIG. 16. Unlike the control logic provided in Table 2 of FIG. 17, wherein only one main-stage valve is opened at a given time, the control logic provided in Table 3 allows multiple main-stage valves to be opened simultaneously. The control data in Table 3 of FIGS. 18A and 18B may be interpreted in the same manner as the control data in Table 2 of FIG. 17.

FIGS. 19A-22B illustrate various exemplary main-stage valve configurations employing an integrated pressure assist mechanism. The integrated pressure assist mechanism operates to urge the spool of the main-stage valve toward either an open position or a closed position, depending on the particular configuration of the pressure assist mechanism, in response to the presence of a predetermined upstream or downstream pressure. For purposes of discussion, the outer member operates as the spool and the inner member operates as the sleeve, and the "upstream pressure" (Pu) refers to the pressure occurring within an interior of the sleeve and the "downstream pressure" (Pd) refers to the pressure in the region surrounding the outside of the spool.

Figure 21A:
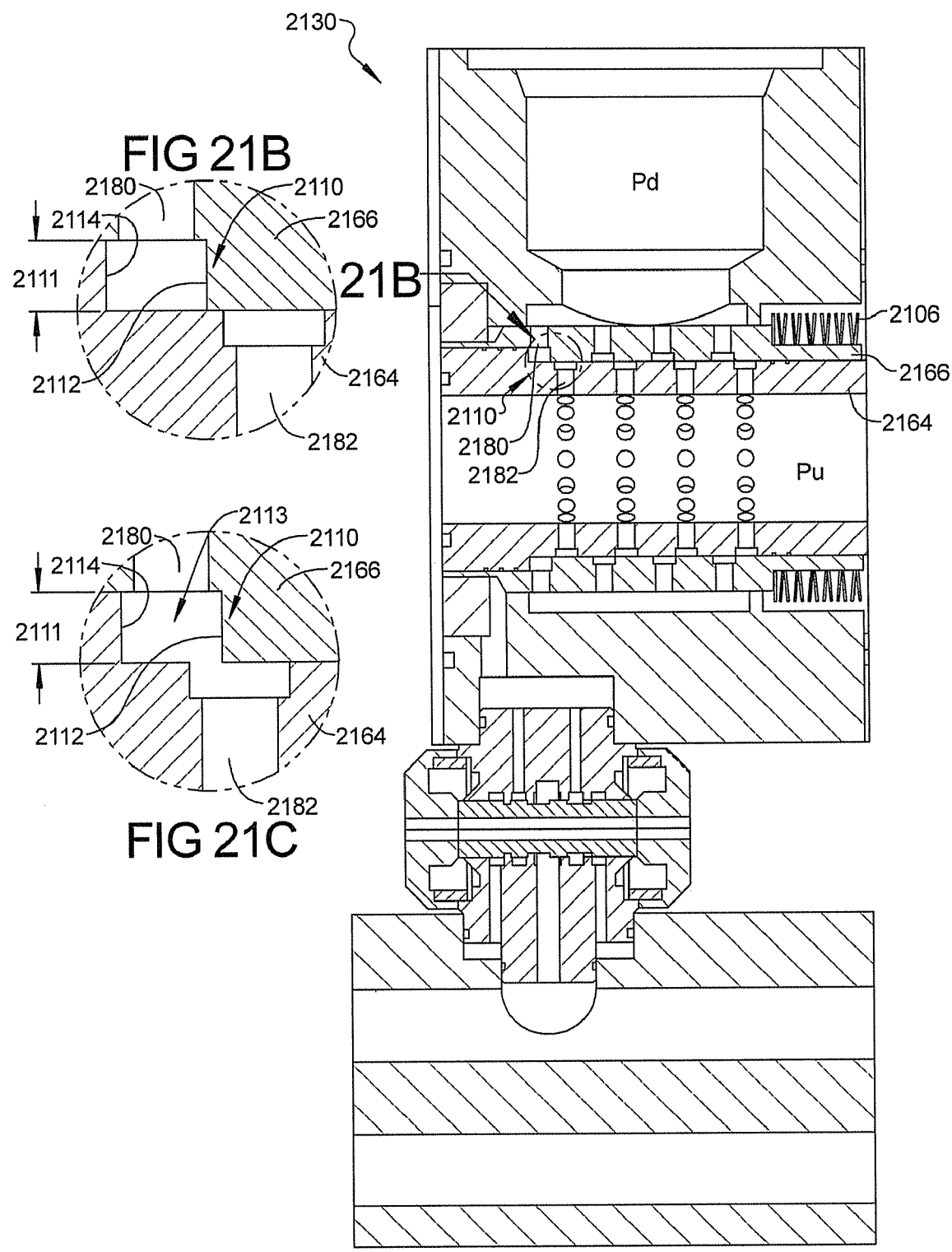
FIG. 21A is a cross-sectional view of an exemplary main-stage valve employing an integrated pressure assist mechanism configured to open the main-stage valve in response to a downstream pressure.
Figure 22A:
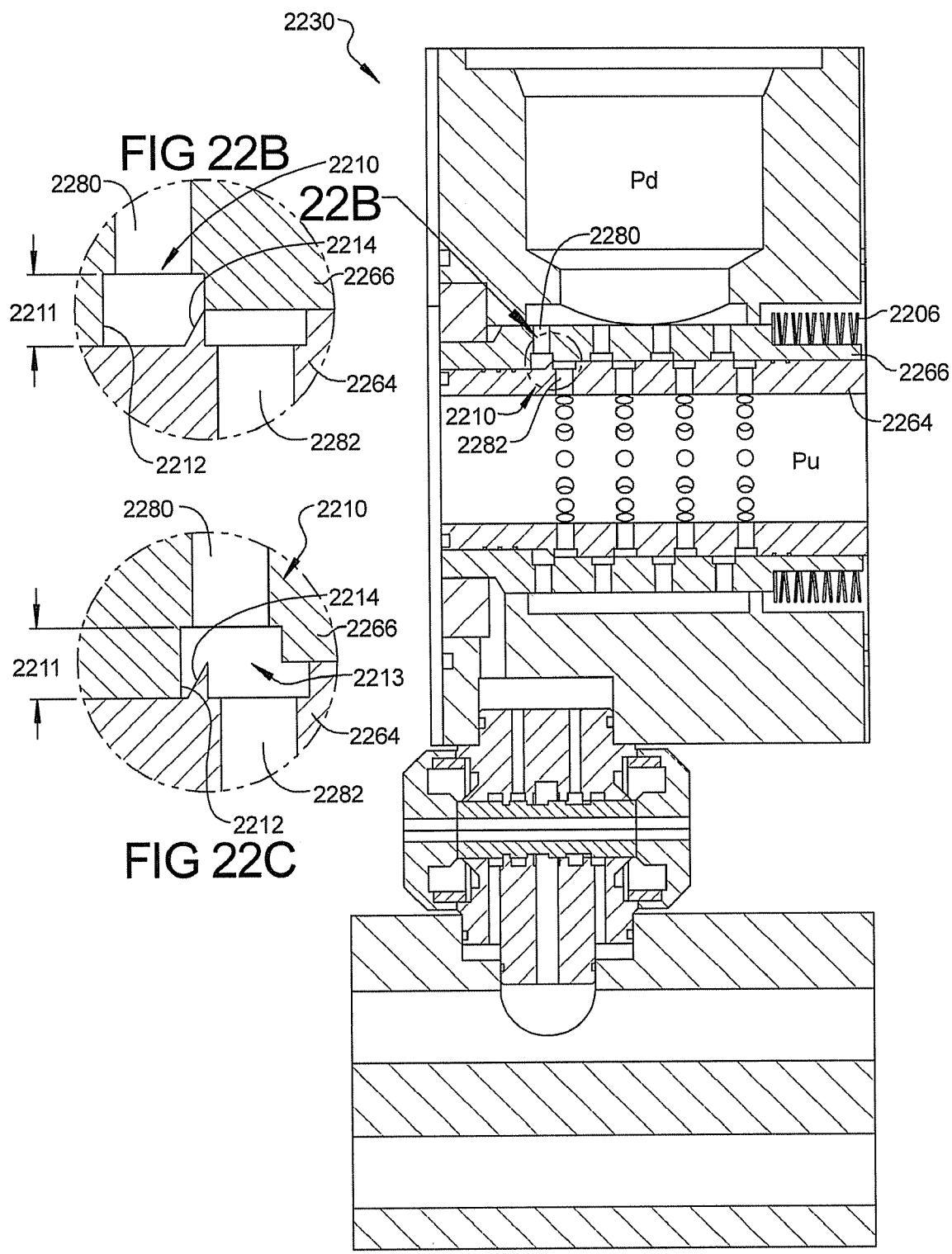
FIG. 22A is a cross-sectional view of an exemplary main-stage valve employing an integrated pressure assist mechanism configured to close the main-stage valve in response to a downstream pressure.

FIG. 19A illustrates an exemplary pressure assist mechanism 1910 configured to open a valve 1930 in response to a predetermined upstream pressure Pu. FIG. 20A illustrates an exemplary pressure assist mechanism 2010 configured to close a valve 2030 in response to a predetermined upstream pressure Pu. FIG. 21A illustrates an exemplary pressure assist mechanism 2110 configured to open a valve 2130 in response to a predetermined downstream pressure Pd. FIG. 22A illustrates an exemplary pressure assist mechanism 2210 configured to close a valve 2230 in response to a predetermined downstream pressure Pd.

The pressure assist mechanism may be incorporated into the main-stage valve by providing a step 1911, 2011, 2111 and 2211 in the respective pressure assist mechanisms 1910, 2010, 2110 and 2210. Each step consists of a step 1912, 2012, 2112 and 2212 formed in a corresponding valve spool, 1966, 2066, 2166 and 2266, respectively, as indicated in FIGS. 19A-22B. A corresponding step 1914, 2014, 2114 and 2214 is also incorporated into a sleeve 1964, 2064, 2164 and 2264, respectively. The step causes opposing pressure induced axial forces to be exerted against the spool and the sleeve, which tend to cause the valve to either open or close depending on the particular configuration of the pressure assist mechanism. The magnitude of the opposing forces is determined, at least in part, by the size of the step. The larger the step the larger the opposing forces for a given pressure drop.

Continuing to refer to FIGS. 19A-22B, the placement of the step relative to orifices in the sleeve (i.e., orifices 1982, 2082, 2182 and 2282) and the spool (i.e., orifices 1980, 2080, 2180 and 2280) determines whether the pressure assist mechanism is responsive to the upstream pressure Pu or downstream pressure Pd. If the step occurs across an orifice of the sleeve when the valve is closed, such as the configuration shown in FIGS. 19A and 20A, the pressure assist mechanism will be responsive to the upstream pressure Pu. If the step occurs across an orifice of the spool when the valve is closed, such as the configuration shown in FIGS. 21A and 22A, the pressure assist mechanism will be responsive to the downstream pressure Pd.

As can be observed from FIGS. 19A-22B, one side of the step may be defined by the spool and an opposite side of the step may be defined by the sleeve. The step in the spool and the sleeve at least partially define a fluid pathway 1913, 2013, 2113 and 2213 between the orifice in the spool and the corresponding orifice in the sleeve when the valve is open. Whether the pressure assist mechanism operates to open or close the valve is determined by which side of the orifice the spool portion of the step is positioned. Positioning the spool portion of the step alongside an edge of the orifice nearest the return spring, such as the configuration shown in FIGS. 19A and 21A, will result in the pressure assist mechanism opening the main-stage valve when a predetermined pressure is achieved. Positioning the spool portion of the step alongside the opposite edge of the orifice away from the return spring, such as the configuration shown in FIGS. 20A and 22 A, will result in the pressure assist mechanism closing the main-stage valve when a predetermined pressure is achieved.

Referring to FIGS. 19A thru 19C, the step 1911 of the pressure assist mechanism 1910 is positioned across the orifice 1982 of the sleeve 1964 (stationary member) when the valve 1930 is arranged in the closed position (i.e., FIGS. 19A and 19B), and consequently the pressure assist mechanism 1910 will be responsive to the upstream pressure Pu (i.e., pressure occurring within the interior region of the sleeve 1964). FIG. 19B is an enlarged view of the pressure assist mechanism 1910, showing the step 1912 in the spool 1966, and the step 1914 in the sleeve 1964. The spool portion of the step 1912 is located alongside the orifice 1982 nearest a return spring 1906. The return spring 1906 may be in communication with at least the spool 1966, and operates to urge the spool 1966 toward the closed position (i.e., FIGS. 19A and 19B) from the open position (i.e., FIG. 19C). Thus, the pressure occurring within the orifice 1982 of the sleeve 1964 will tend to push the step 1912 away from the step 1914 of the sleeve 1964, and toward the return spring 1906, thereby opening the valve 1930 when the predetermined pressure is achieved, such as illustrated in FIG. 19C.

The steps 1912 and 1914 cooperate with one another to at least partially define the fluid pathway 1913 between the orifice 1982 of the sleeve 1964 and the orifice 1980 of the spool 1966 when the valve 1930 is arranged in the open position, as shown in FIG. 19C. With the valve 1930 arranged in the open position, the steps 1912 and 1914 may be fluidly connected to the orifices 1980 and 1982. The steps 1912 and 1914 may be substantially fluidly disconnected from the orifice 1980 when the valve 1930 is arranged in the closed position, as shown in FIGS. 19A and 19B, but remain fluidly connected to orifice 1982.

Referring to FIGS. 20A thru 20C, the step 2011 of the pressure assist mechanism 2010 is positioned across the orifice 2082 of the sleeve 2064 (stationary member) when the valve 2030 is arranged in a closed position (i.e., FIGS. 20A and 20B), and consequently the pressure assist mechanism 2010 will be responsive to the upstream pressure Pu (i.e., pressure occurring within the interior region of the sleeve 2064). The spool portion 2066 of the step 2012 is located alongside the orifice 2082 furthest from a return spring 2006. The return spring 2006 operates to urge the spool 2066 toward the closed position (i.e., FIGS. 20A and 20B) from the open position (i.e., FIG. 20C). FIG. 20B is an enlarged view of the pressure assist mechanism 2010, illustrating the positioning of the step 2012 in the spool 2066, as well as the corresponding step 2014 in the sleeve 2064, when the valve 2030 is arranged in the closed position. FIG. 20C is an enlarged view of the valve 2030 arranged in the open position, with the orifices 2080 of the spool 2066 fluidly connected to the orifices 2082 of the sleeve 2064. The pressure occurring within the orifice 2082 of the sleeve 2064 will tend to urge the step 2012 of the spool 2066 away from the step 2014 of the sleeve 2064 and away from the return spring 2006, thereby closing the valve 2030 when a predetermined pressure is achieved, such as shown in FIGS. 20A and 20B.

The steps 2012 and 2014 cooperate with one another to at least partially define the fluid pathway 2013 between the orifice 2082 of the sleeve 2064 and the orifice 2080 of the spool 2066 when the valve 2030 is arranged in the open position, as shown in FIG. 20C. When the valve 2030 is arrange in the open position (FIG. 20C), the steps 2012 and 2014 may be fluidly connected to the orifices 2080 and 2082. The steps 2012 and 2014 may be substantially fluidly disconnected from the orifice 2080 when the valve 2030 is arranged in the closed position, as seen in FIGS. 20A and B, but remain fluidly connected to orifice 2082.

Referring to FIGS. 21A thru 21C, the step 2111 of the pressure assist mechanism 2110 is positioned across the orifice 2180 of the spool 2166 (moveable member) when the spool 2166 is arranged in a closed position (i.e., FIGS. 21A and 21B), and as a consequence, the pressure assist mechanism 2010 will be responsive to the downstream pressure Pd (i.e., pressure occurring around the exterior region of the spool 2166). The spool portion of the step 2111 is located alongside the orifice 2180 nearest a return spring 2106. The return spring 2106 operates to urge the spool 2166 toward the closed position (i.e., FIGS. 21A and 21B). FIG. 21B is an enlarged view of the pressure assist mechanism 2110, showing the positioning of the step 2112 in the spool 2166, and the corresponding step 2114 in the sleeve 2164, with the valve 2130 arranged in the closed position, and FIG. 21C is an enlarged view of the valve 2130 with the spool 2166 arranged in an open position. The pressure occurring within the orifice 2180 of the spool 2166 will tend to push the step 2112 away from the step 2114 of the spool 2166 and toward the return spring 2106, thereby opening the valve 2130 when a predetermined pressure is achieved, such as illustrated in FIG. 21C.

The steps 2112 and 2114 cooperate with one another to at least partially define the fluid pathway 2113 between the orifice 2182 of the sleeve 2164 and the orifice 2180 of the spool 2166 when the valve 2130 is arranged in the open position, as shown in FIG. 21C. With the valve 2130 arranged in the open position, the steps 2112 and 2114 are fluidly connected to the orifices 2180 and 2182. The steps 2112 and 2114 may be substantially fluidly disconnected from the orifice 2182 when the valve 2130 is arranged in the closed position, as shown in FIGS. 21A and 21B, but remain fluidly connected to orifice 2180.

Referring to FIGS. 22A thru 22C, the step 2211 of the pressure assist mechanism 2210 is positioned across the orifice 2280 of the spool 2266 (moveable member) when the spool is arranged in a closed position (i.e., FIGS. 22A and 22B), and thus, the pressure assist mechanism 2210 will be responsive to the downstream pressure Pd (i.e., pressure occurring around the exterior region of the spool 2266). FIG. 22B is an enlarged view of the pressure assist mechanism 2210 showing the relative positioning of the step 2212 in the spool 2266 and the step 2214 in the sleeve 2264 when the valve 2230 is arranged in a closed position, and FIG. 22C is an enlarged view of the valve 2230 with the spool 2266 arranged in an open position. The spool portion of the step 2212 is located alongside the orifice 2280 furthest from a return spring 2206. The return spring 2206 operates to urge the spool 2266 toward the closed position, as shown in FIGS. 22A and 22B. Thus, the pressure occurring within the orifice 2280 of the spool 2266 will tend to push the step 2212 away from the step 2214 of the spool 2266 and away from the return spring 2206, thereby urging the valve 2230 toward the closed position when a predetermined pressure is achieved.

The steps 2212 and 2214 cooperate with one another to at least partially define the fluid pathway 2213 between the orifice 2282 of the sleeve 2264 and the orifice 2280 of the spool 2266 when the valve 2230 is arranged in the open position, as shown in FIG. 22C. With the valve 2230 in the open position, the steps 2212 and 2214 may be fluidly connected to the orifices 2280 and 2282. The steps 2212 and 2214 may be substantially fluidly disconnected from the orifice 2282 when the valve 2230 is arranged in the closed position, as shown in FIGS. 22A and 22B, but remain fluidly connected to orifice 2280.

It should be noted that, although pressure assist mechanisms 1910, 2010, 2110 and 2210 are illustrated as being positioned across the orifice located either furthest or closest to the return spring, the step of the pressure assist mechanisms 1910, 2010, 2010 and 2210 may be located across any of the orifices in the spool or the sleeve. Also, in another example, the steps of the pressure assist mechanisms 1910, 2010, 2110 and 2210 may be located at any position along the spool or the sleeve, provide the pressure assist mechanism is in fluid communication with an orifice of the sleeve or the spool.

Figure 23:
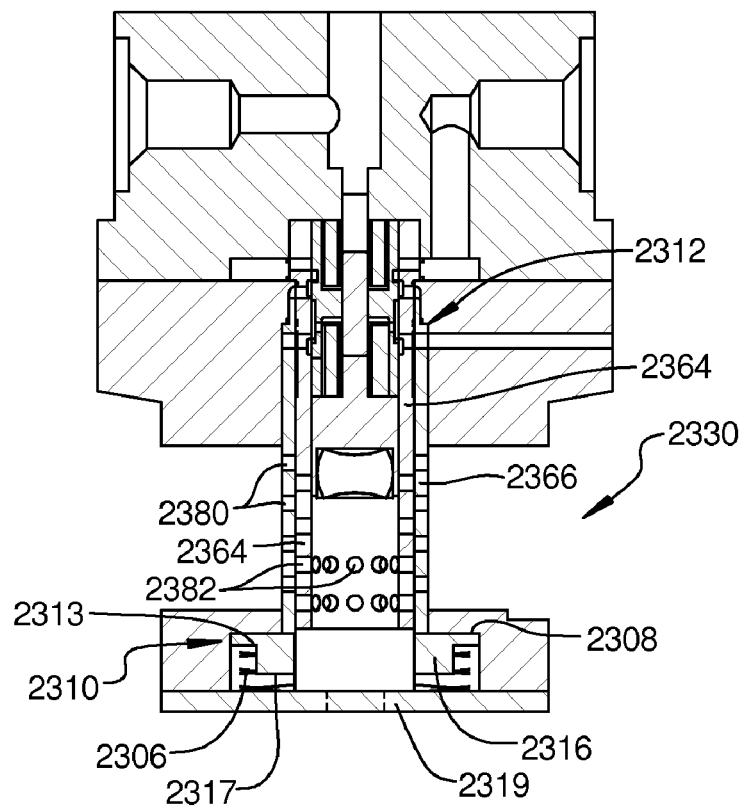
FIG. 23 is a partial cross-sectional view of a damping system employed with the main-stage valve for reducing impact forces occurring when a spool of the main-stage valve is moved between a closed position and an open position.
Figure 24:
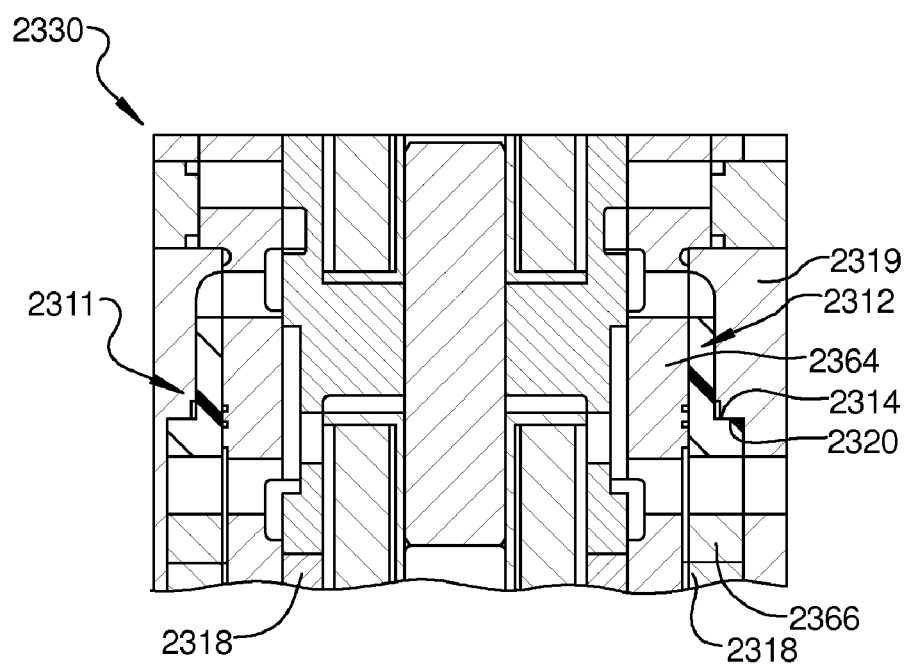
FIG. 24 is an enlarged partial cross-sectional view of the damping system in FIG. 23.

Cycling the main-stage valve between the open and closed positions may generate high impact forces when the spool contacts stops that limit the travel of the spool. This may not only produce undesirable noise, but may also impact the durability of the main-stage valve and the accuracy with which the valve can be controlled. FIG. 23 is an illustration of an exemplary valve 2330 employing a spool 2366 having a damper 2312 fixedly attached to an end of the spool. The damper 2312 may be constructed from an elastically compliant material for absorbing at least a portion of the impact forces occurring when the valve is moved from the open position to the closed position. A generally opposing end of the valve 2330 may include a second damper 2310 that operates to dampen the impact forces occurring when the valve is moved from the closed position to the open position. FIG. 24 is an enlarged view of the end of the main-stage spool 2366, showing a stop region 2311 of the damper 2312 contacting a stop 2320 of a valve housing 2319 when the valve is arranged in the closed position.

The valve 2330 may include a generally cylindrical-shaped hollow sleeve 2364 fixed relative to the valve housing 2319, and the generally cylindrical-shaped spool 2366, which is slideably disposed around the outside of the sleeve 2364. The spool 2366 is free to move back and forth over a portion of the length of the sleeve 2364 between the open position and the closed position. FIGS. 23 and 24 illustrate the valve 2330 arranged in the closed position. The valve 2330 may employ a biasing member, which is illustrated as a return spring 2306, for moving the spool 2366 from the open position to the closed position.

Referring to FIG. 23, the sleeve 2364 and the spool 2366 each may include a series of orifices 2382 and 2380 that extend through the walls of the respective components. The orifices 2380 in the spool 2366 are fluidly connected to the orifices 2382 in the sleeve 2364 when the spool 2366 is positioned in an open position relative to the sleeve 2364. The orifices 2380 and 2382 are substantially fluidly disconnected from the orifices 2382 in the sleeve 2364 when the spool 2366 is positioned in a closed position relative to the sleeve 2364.

Continuing to refer to FIG. 23, the impact forces produced upon opening the valve 2330 may be dampened by constructing the damper 2310 from an elastically compliant material. Suitable materials may include, but are not limited to, engineered plastics, such as polyetheretherkeone having approximately twenty percent carbon fiber filler. The damper 2310 may include a bearing surface 2308 that engages an end of the spool 2366. The damper 2310 may further include a stop region 2316 having an end 2317 that engages the valve housing 2319 to limit the travel of the main-stage spool 2366 upon opening. Opening the valve 2330 causes the spool 2366 to displace the damper 2310 toward the housing 2319. The damper 2310 may elastically deform upon impacting the valve housing 2319 to absorb at least a portion of the impact energy. The damper 2310 may also include a flange 2313 that engages an end of the biasing member 2306. An opposite end of the biasing member engages the valve housing 2319. At least a portion of damper 2310 may be disposed within the biasing member 2306. The biasing member 2306 operates to urge the spool 2366 toward the closed position. The end 2317 of the damper 2310 is disengaged from the housing 2319 when the spool 2366 is displaced away from the open position.

With reference to FIG. 24, the impact forces produced upon closing the valve 2330 may be dampened by forming the damper 2312 from an elastically compliant material. The stop region 2311 of damper 2312 may include a shoulder 2314 that engages the stop 2320 formed in the valve housing 2319 as the spool 2366 of the valve 2330 is moved to the closed position. The shoulder 2314 may be any surface of the damper 2312 that contacts the surface of the stop 2320 of the valve housing as the valve 2330 is closed.

The damper 2312 may elastically deform to absorb at least a portion of the impact energy that is created as the shoulder 2314 of the damper contacts the stop 2320 of the valve housing as the valve 2330 is closed. The shoulder 2314 disengages the stop 2320 when the valve 2330 is moved to the open position. Suitable materials for the damper 2312 may include, but are not limited to, engineered plastics, such as polyetheretherkeone having approximately twenty percent carbon fiber filler. When the damper 2312 impacts the stop 2320 upon closing the valve 2330, the elastically compliant material elastically deforms to absorb at least a portion of the impact energy and cushion the impact. The elastically compliant material may be the same or a different material than the material used to construct the remaining portion of the spool 2366.

Figure 25A:
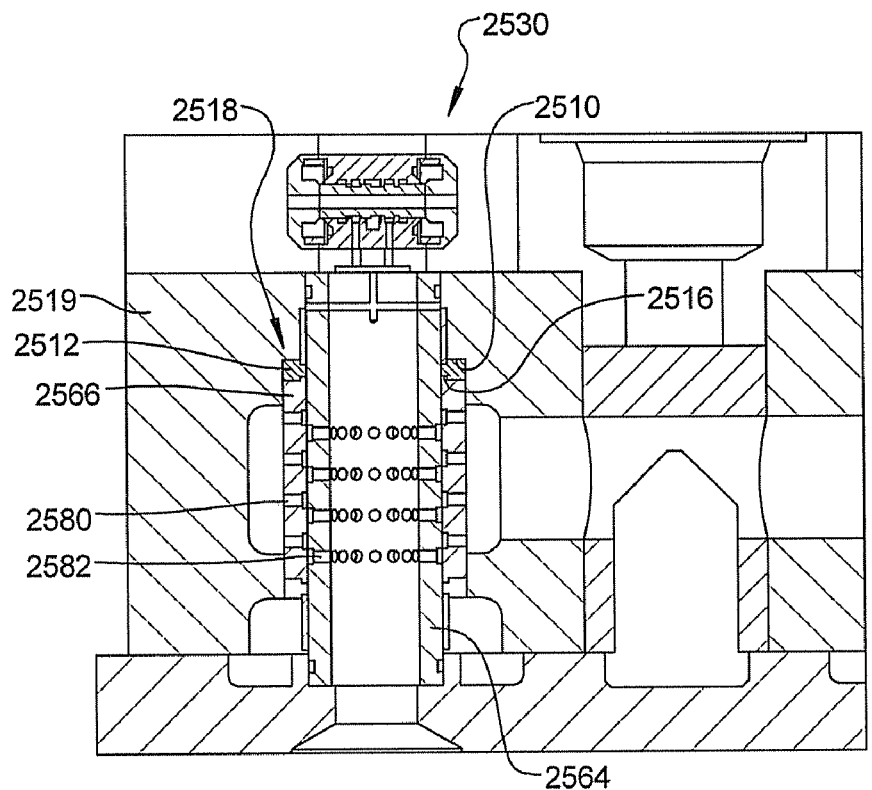
FIG. 25A is a partial cross-sectional view of a damping system employed with a main-stage valve for reducing impact forces occurring when the spool of the main-stage valve is moved to the closed position.

With reference to FIG. 25A, the impact forces produced upon closing a valve 2530 may be dampened by forming a portion of a spool 2566 that contacts the valve housing out of an elastically compliant material capable of absorbing at least a portion of the impact forces occurring when the valve is closes. The valve 2530 may include a generally cylindrical-shaped hollow sleeve 2564 fixed relative to a valve body 1519, and the generally cylindrical-shaped spool 2566, which is slideably disposed around the outside of the sleeve 2564. The spool 2566 is free to move back and forth over a portion of the length of the sleeve 2564 between an open position and a closed position. FIG. 25A illustrates the valve 2530 arranged in the closed position. The sleeve 2564 and the spool 2566 each may include a series of orifices 2582 and 2580 that extend through the walls of the respective components. The orifices 2580 and 2582 are generally arranged in a common pattern to enable the orifices 2580 in the spool 2566 to be generally aligned with the orifices 2582 in the sleeve 2564 when the spool 2566 is positioned in the open position relative to the sleeve 2564. The orifices 2580 and 2582 are generally misaligned with the orifices 2582 in the sleeve 2564 when the spool 2566 is positioned in the closed position relative to the sleeve 2564

The spool 2566 may include a stepped region 2518 that engages a stop 2510 fanned in a valve housing 2519. The stepped region 2518 may include a ring 2512 attached to the spool 2566. In one example, the ring 2512 may be formed from an elastically compliant material, such as an engineered plastic for example, polyetheretherkeone having approximately twenty percent carbon fiber filler. It shall be appreciated, however, that other generally elastic compliant materials may also be employed.

Figure 25B:
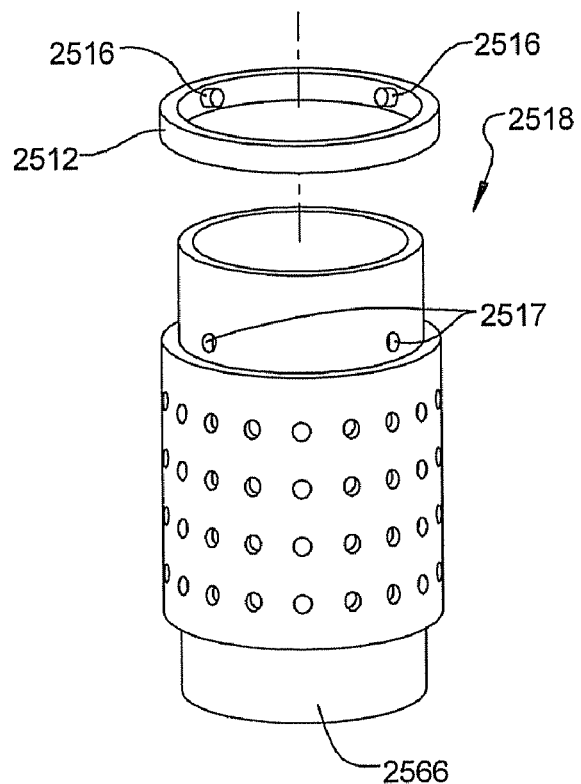
FIG. 25B is an exploded view of a damping ring and a spool as seen in FIG. 25A.

FIG. 25B is an exploded view of the spool 2566 with the elastically compliant ring 2512 shown removed from the spool 2566. The elastically compliant ring 2512 impacts the stop 2510 in the valve housing 2519 upon closing the valve 2530. The elastically compliant ring 2512 deforms elastically upon impacting the stop 2510 to absorb at least a portion of the impact energy upon closing the valve 2530. The elastically compliant portion of the spool 2566 may be formed by over-molding the elastically complaint ring 2512 to the spool 2566. The elastically compliant ring 2512 may be secured to the spool 2566 by providing the ring 2512 with at least one inwardly extending boss 2516 that engages a corresponding aperture 2517 formed in the spool 2566. It should be noted, however, that the ring 2512 may be secured to the spool 2566 in other ways as well. For example, the compliant ring 2512 may engage an annular circumferential slot formed in the spool 2566.

Figure 26:
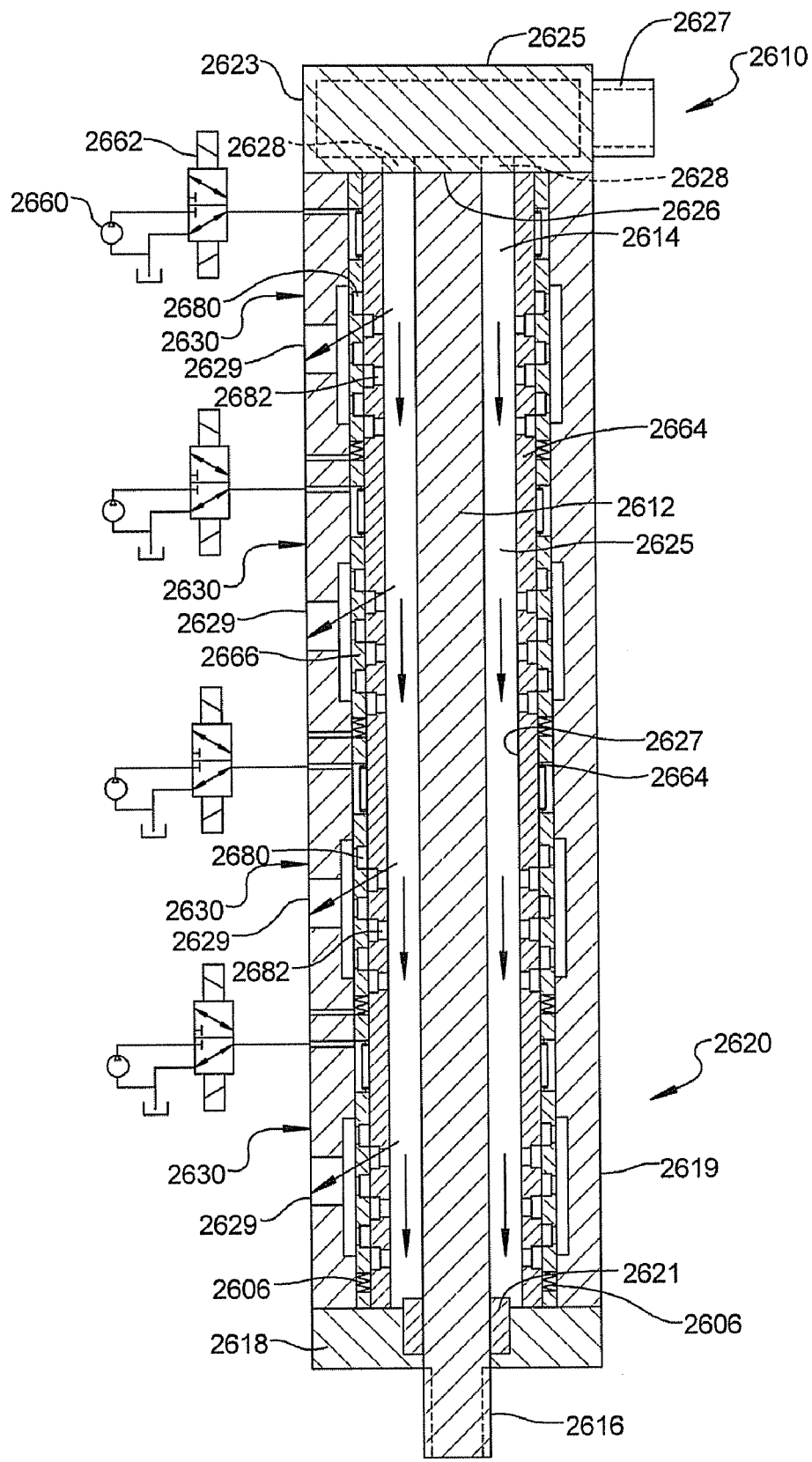
FIG. 26 is a partial cross-sectional view of the co-linear valve arrangement of FIGS. 1A and 4 integrated with a hydraulic pump assembly.

With reference to FIG. 26, a valve manifold 2620 employing the co-linear valve arrangement, such as shown in FIG. 1A, may be integrated with a pump assembly 2610 for supplying pressurized fluid to a series of valves 2630. This arrangement minimizes the manifold volume, which in turn may improve the overall operating efficiency of a hydraulic system that includes the pump assembly 2610. The pump assembly 2610 may include any of a variety of known fixed displacement pumps, including but not limited to, gear pumps, vane pumps, axial piston pumps, and radial piston pumps. The pump assembly 2610 may include a pump input shaft 2612 for driving the pump assembly 2610.

The valve manifold 2620 may include multiple hydraulically actuated spool valves 2630. Each of the valves 2630 may include a generally cylindrical-shaped hollow sleeve 2664 that is fixed relative to the manifold 2620, and a generally cylindrical-shaped spool 2666 that is slideably disposed around the outside of the sleeve 2664. The spools 2666 are free to move back and forth over a portion of the length of the sleeve 2664 between an open position and a closed position.

The sleeve 2664 and the spool 2666 each may include a series of orifices that extend through the walls of the respective components. The spool 2666 includes a series of orifices 2680 and the sleeve 2664 includes a series of orifices 2682. The orifices 2680 and 2682 are generally arranged in a common pattern to enable the orifices 2680 in the spool 2666 to be generally aligned with the orifices 2682 in the sleeve 2664 when the spool 2666 is positioned in the open position relative to the sleeve 2664. FIG. 26 illustrates the spool 2666 positioned in the closed position, where the orifices 2680 and 2682 are generally misaligned with one another to substantially restrict fluid communication between the spool 2666 and the sleeve 2664. The valves 2630 may each employ a biasing member, illustrated as a return spring 2606, for moving the spool 2666 from the open position to the closed position.

Extending from the pump 2610 is a pump input shaft 2612. The pump input shaft 2612 may extend lengthwise through a plenum 2614 formed by the interconnected valve sleeves 2664 of the individual valves 2630. An end 2616 of the pump input shaft 2612 extends through an end cap 2618 of the main-stage manifold 2620, and may be connected to an external power source, such as an engine, electric motor, or another power source capable of outputting a rotational torque. The end cap 2618 may be attached to a housing 2619 of the manifold 2620, and may include a bearing 2621, for example, a needle bearing, roller bearing, or sleeve bearing, for rotatably supporting the end 2616 of the pump input shaft 2612.

The valves 2630 may be hydraulically actuated by a solenoid operated pilot valve 2662. The pilot valve 2662 may be fluidly connected to a pressure source, such as a pump 2660. When opened, the pilot valve 2662 allows pressurized fluid from the pump 2660 to flow through the pilot valve 2662 to the valve 2630. The pressurized fluid from the pilot valve 2662 causes the spool 2666 of the valve 2630 to move to the open position, thereby allowing pressurized fluid to flow from the pump 2610 through the valve 2630 to a hydraulic load. Closing the pilot valve 2662 stops the flow of pressurized fluid to the valve 2630, thereby allowing the return spring 2606 to move the spool 2666 of the valve 2630 back to the closed position.

The pump assembly 2610 may be configured to allow fluid to enter the pump assembly 2610 through an inlet passage 2627. The inlet passage 2627 may be positioned at any of a variety of locations on the pump assembly, including but non limited to, on an outer circumference 2623 of the pump assembly 2610, on a side 2625 of the pump assembly 2610 opposite the valve manifold 2620, or any other suitable location. For purposes of discussion, the inlet passage 2627 is shown in FIG. 26 arranged along the outer circumference 2623 of the pump. The fluid enters the pump assembly 2610 through the inlet passage 2627 and travels radially inward as the fluid passes through the pump assembly 2610. Pressurized fluid may exit the pump assembly 2610 through one or more discharge ports 2628 arranged along a side 2626 of the pump assembly 2610. The pressurized fluid may be discharged from the pump assembly into the plenum 2614 formed by the interconnected sleeves 2664 of the valves 2630. The pressurized fluid can travel along an annular passage 2625 formed between an inner wall 2627 of the sleeves 2664 and the input shaft 2612 to the respective valves 2630. Actuating one or more of the valves 2630 to the open position allows the pressurized fluid to pass through the orifices 2680 in the spool 2666 and the orifices 2682 in the sleeve 2664 to an exit port 2629 of the valve 2630.

Figure 27:
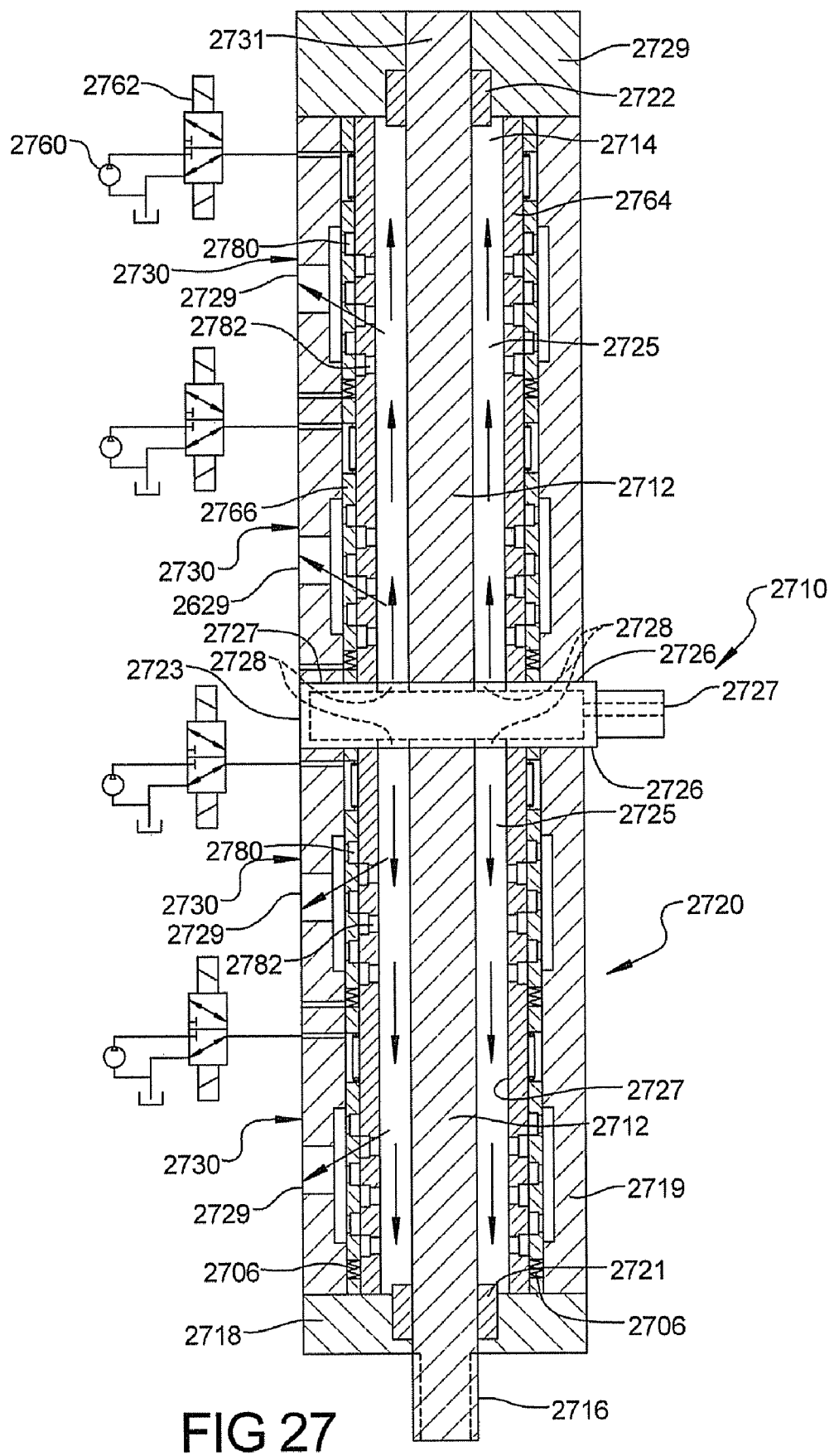
FIG. 27 is a partial cross-sectional view of the split co-linear valve arrangement of FIG. 5 integrated with a hydraulic pump assembly.

FIG. 27 shows a pump assembly 2710 integrated into a valve manifold 2720 employing the split collinear valve arrangement shown in FIG. 5. This arrangement also minimizes the manifold inlet volume, which in turn may improve the overall operating efficiency of a hydraulic system. In this configuration, the pump assembly 2710 is arranged between two sets of valves 2730. Arranging the pump assembly 2710 between the valves 2730 may require an inlet 2727 of the pump assembly 2710 to be positioned along an outer circumference 2723 of the pump assembly 2710. However, depending on the size and configuration of the pump assembly 2710, it may also be possible to position the pump inlet 2727 at another location on the pump.

The valve manifold 2720 may include multiple hydraulically actuated spool valves 2730. Each of the valves 2730 may include a generally cylindrical-shaped hollow sleeve 2764 that is fixed relative to the manifold 2720, and a generally cylindrical-shaped spool 2766, which is slideably disposed around the outside of the sleeve 2764. The spools 2766 are free to move back and forth over a portion of the length of the sleeve 2764 between an open position and a closed position.

The sleeve 2764 and the spool 2766 each may include a series of orifices that extend through the walls of the respective components. The spool 2766 includes a series of orifices 2780 and the sleeve 2764 includes a series of orifices 2782. The orifices 2780 and 2782 are generally arranged in a common pattern to enable the orifices 2780 in the spool 2766 to be generally aligned with the orifices 2782 in the sleeve 2764 when the spool 2766 is positioned in an open position relative to the sleeve 2764. The valves 2730 may each employ a biasing member, illustrated as a return spring 2706, for moving the spool 2766 from the open position to the closed position.

The valves 2730 may be hydraulically actuated by a solenoid operated pilot valve 2762. The pilot valve 2762 may be fluidly connected to a pressure source, such as a pump 2760. When opened, the pilot valve 2762 allows pressurized fluid from the pump 2760 to flow through the pilot valve 2762 to the valves 2730. The pressurized fluid from the pilot valve 2762 causes the spool of the valve 2730 to move to the open position, thereby allowing pressurized fluid to flow from the pump assembly 2710 through the valves 2730 to a hydraulic load. Closing the pilot valve 2762 stops the flow of pressurized fluid to the valve and allows the return spring 2706 to move the spool 2766 back to the closed position.

The pump assembly 2710 may include a pump input shaft 2712 that extends outward from at least one side of the pump assembly 2710. The pump input shaft 2712 extends lengthwise through a plenum 2714 formed by the interconnected valve sleeves 2764 of the individual valves 2730. An end 2716 of the pump input shaft 2712 extends through an end cap 2718 of the manifold 2720 and may be rotatably supported by a bearing 2721, which may include, for example, a needle bearing, roller bearing, or sleeve bearing. The end cap 2718 may be attached to the housing 2719 of the manifold 2720 and may include the bearing 2721. The end 2716 of the pump input shaft 2712 may be exposed and connected to an external power source, such as an engine, electric motor, or another power source capable of outputting a rotational torque. The pump assembly 2710 may also be configured to have the pump input shaft 2712 extend from both sides of the pump assembly 2710, in which case an opposite end 2731 of the pump input shaft 2712 may be rotatably supported by a bearing 2722 mounted to a manifold end cap 2729 that is attached to the manifold housing 2719.

Fluid enters the pump assembly 2710 through the pump inlet 2727 and travels radially inwardly as the fluid passes through the pump assembly 2710. Pressurized fluid may exit the pump assembly 2710 through one or more discharge ports 2728 arranged along opposite sides 2726 and 2727 of the pump assembly 2710. The pressurized fluid may be discharged from the pump assembly 2710 into the plenum 2714 formed by the interconnected sleeves 2764 of the valves 2730. The pressurized fluid can travel along an annular passage 2725 formed between the inner wall 2727 of the sleeves 2764 and the pump input shaft 2712 to the respective valves 2730. Actuating the valve 2730 to the open position allows the pressurized fluid to pass through the orifices 2780 in the spool 2766 and the orifices 2782 in the sleeve 2664 to an exit port 2729 of the valves 2730.

Figure 28B:
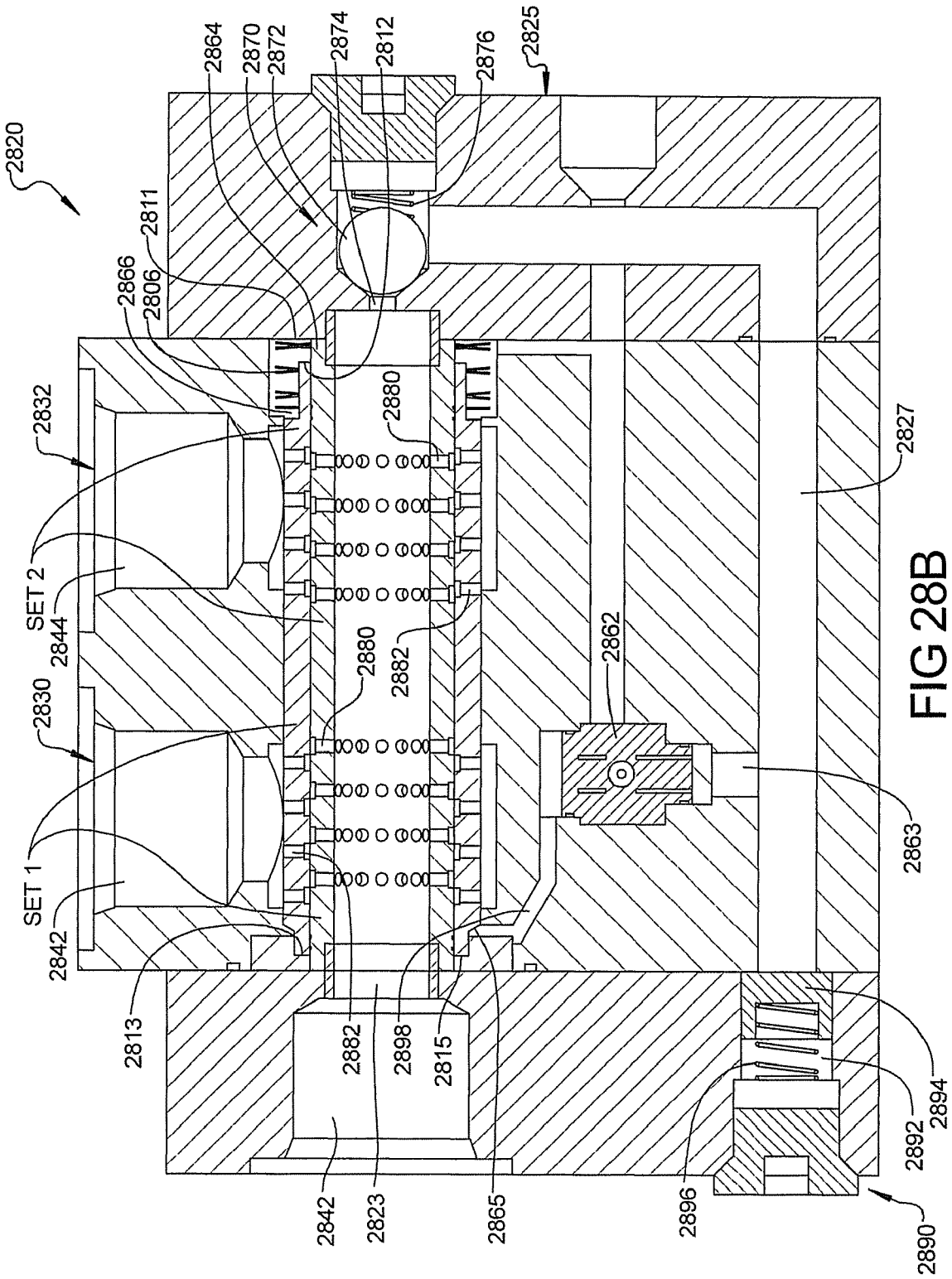
FIG. 28B is a partial cross-sectional view of the exemplary main-stage manifold in FIG. 28A, with the spool arranged in a second position

FIGS. 28A-28B illustrate a manifold 2820 for controlling the distribution of pressurized fluid to multiple hydraulic loads having variable flow and pressure requirements. The manifold 2820 includes a pair of valves 2830 and 2832 that employ a single sleeve 2864 and a single spool 2866. Although the manifold 2820 is depicted in FIGS. 28A and 28B as having two valves 2830 and 2832, it shall be appreciated that in practice the manifold 2820 may include more valves depending, at least in part, on the requirements of the particular application.

Each of the valves 2830 and 2832 share the generally cylindrical-shaped hollow sleeve 2864 that is fixed relative to the manifold 2820, and the generally cylindrical-shaped spool 2866, which is slideably disposed around the outside of the sleeve 2864. The spool 2866 is free to move back and forth over a portion of the length of the sleeve 2864 between a first position and a second position.

The sleeve 2864 and the spool 2866 each may include a series of orifices that extend through the walls of the respective components. The spool 2866 includes a series of orifices 2880 and the sleeve 2864 includes a series of orifices 2882. The orifices 2880 of the sleeve 2864 that correspond with orifices 2882 of the spool 2866 for the valve 2830 are designated as Set 1, and the orifices 2880 of the sleeve 2864 that correspond with orifices 2882 of the spool 2866 for the valve 2832 are designated as Set 2. The spool 2866 is movable axially relative to the sleeve 2864 between the first position and the second position. The spool 2866 allows fluid to pass from the interior region of the sleeve 2864 to the exit port 2842 of valve 2830 when the spool is in the first position (FIG. 28A), and the spool 2866 allows fluid to pass from the interior region of the sleeve 2864 to the exit port 2844 of the valve 2832 when the spool is in the second position (FIG. 28B). The orifices 2880 and 2882 of Set 1 (i.e., valve 2830) are generally arranged in a common pattern to enable the orifices 2880 in the spool 2866 to be generally aligned with the orifices 2882 in the sleeve 2864 when the spool 2866 is positioned in the first position (FIG. 28A). Similarly, the orifices 2880 and 2882 of Set 2 (i.e., valve 2832) are generally arranged in a common pattern to enable the orifices 2880 in the spool 2866 to be generally aligned with the orifices 2882 in the sleeve 2864 when the spool 2866 is position in the second position (FIG. 28B). With the spool 2866 arranged in the first position (FIG. 28A), the orifices 2880 and 2882 of Set 2 (i.e., valve 2832) are misaligned such that the spool 2866 of the valve 2832 is substantially fluidly disconnected from the sleeve 2864 of the valve 2832. With the spool 2866 arranged in the second position (FIG. 28B), the orifices 2880 and 2882 of Set 1 (i.e., valve 2830) are misaligned such that the spool 2866 of the valve 2830 is substantially fluidly disconnected from the sleeve 2864 of the valve 2830.

The spool 2866 is depicted in FIG. 28A in the first position, wherein the valve 2830 is open and the valve 2832 closed. The valve 2830 may be arranged in the closed position, as shown in FIG. 28B, by sliding the spool 2866 axially relative to the sleeve 2864, which also simultaneously opens the valve 2832. Opening either of the valves 2830 or 2832 allows pressurized fluid to pass through the valves 2830 and 2832 to the respective exit ports 2842 and 2844. Closing either one of the valves 2830 and 2832 causes the other valve to open. Likewise, opening one of the valves 2830 and 2832 causes the other valve to close.

Manifold 2820 may also include a pilot valve 2862 for actuating the spool 2866 between the second position and the first position. The valves 2830 and 2832 may be hydraulically actuated by means of the pilot valve 2862, which may be a solenoid operated pilot valve. The pilot valve 2862 may include an inlet port 2863 fluidly connected to a pressure source. The pilot valve 2862 may be selectively activated to allow fluid pressure to be applied to an end 2865 of the spool 2866 to move the spool from the second position (FIG. 28B), in which valve 2832 is open and valve 2830 is closed, to the first position (FIG. 28A), in which valve 2830 is opened and valve 2832 is closed. The valves 2830 and 2832 may also employ a biasing member, illustrated as a return spring 2806, for moving the spool 2866 between the first position (FIG. 28A), where the valve 2830 is open and the valve 2832 is closed, and the second position (FIG. 28B), where valve 2830 is closed and the valve 2832 is open.

The positioning of the spool 2866 relative to the sleeve 2864 may be controlled by means of a stop 2811 that engages a first end 2812 of the spool 2866, or another suitable region of the spool 2866, when the spool 2866 is arranged in the first position (FIG. 28A). The positioning of the spool 2866 relative to the sleeve 2864 may also be controlled by means of a second stop 2813 that engages a second end 2815 of the spool 2866, or another suitable region of the spool 2866, when the spool 2866 is arranged in the second position (FIG. 28B).

In one example, the spool 2866 may be moved to the first position, as illustrated in FIG. 28A, by arranging the pilot valve 2862 in an open position, which opens the valve 2830 and closes the valve 2832. Arranging the pilot valve 2862 in the open position delivers pressurized fluid to the cavity 2898 adjacent the end 2815 of the spool 2866. The force exerted by the pressurized fluid overcomes the biasing force exerted by the return spring 2806 and displaces the spool 2866 toward the stop 2811 and into the first position. The spool 2866 may returned to the second position, which closes the valve 2830 and opens the valve 2832 (FIG. 28B), by closing the pilot valve 2862 to depressurize the cavity 2898. This allows the biasing force exerted by the return spring 2806 to slide the spool 2866 axially to the second position. The manifold may also be configured such that arranging the pilot valve 2862 in the open position opens valve 2832 and arranging the pilot valve in the closed position opens valve 2830, provided that the return spring 2806 is positioned on the other end of the spool 2866.

The valves 2830 and 2832 may be configured such that either the inner or outer member operates as the spool 2866. In the exemplary valve illustrated in FIGS. 28A and 28B, the inner member functions as the sleeve 2864 and the outer member functions as the spool 2866 (i.e., is movable relative to the sleeve). It shall be appreciated, however, that in practice, the inner member may be configured to operate as the spool 2866 and the outer member as the sleeve 2864. Further, the valves 2830 and 2832 may also be configured such that both the inner and outer members move simultaneously relative to the valve body. This latter configuration may produce faster valve actuation speeds, but may do so at the risk of increased complexity and cost.

Although the flow of pressurized fluid is described as passing radially outward through the exemplary valves 2830 and 2832 when arranged in the open position, it shall be appreciated that the main-stage manifold may also be configured such that the flow passes radially inward. In that case, the passages designated as the respective exit ports 2842 and 2844 would operate as an inlet port, and the passage designated as the inlet port 2842 would operate as an exit port. The direction in which the pressurized fluid passes through the valves 2830 and 2832 is not dependent on whether the inner or outer valve member operate as the spool, or whether both members are moveable relative to one another when the valves are actuated.

The valves 2830 and 2832 and the pilot valve 2862 may have separate pressure supplies or may share a common pressure source. In the exemplary manifold configuration illustrated in FIGS. 28A and 28B, the valves 2830 and 2832, and the pilot valve 2862, are shown sharing a common pressure source. The pressurized fluid for supplying both the valves 2830 and 2832, and the pilot valve 2862, enters the main-stage manifold through an inlet port 2842. The inlet port 2842 is fluidly connected to the sleeve 2864.

The valves 2830 and 2832 may be connected in series to form an elongated plenum 2823. Fluidly connected to a downstream end of the sleeve 2864 of the valve 2832 is a pilot manifold 2825. The pilot manifold 2825 includes a pilot supply passage 2827 through which a portion of pressurized fluid may be bled from the main-stage fluid supply and delivered to the pilot valve 2862. The inlet port 2863 of the pilot valve 2862 may be fluidly connected to the pilot supply passage 2827.

The pilot manifold 2825 may include a check valve 2870. The check valve 2870 operates to control the flow of pressurized fluid delivered to the pilot manifold 2825, and also prevent fluid from back flowing from the pilot manifold 2825 to the plenum 2823. The check valve 2870 may have any of a variety of configurations. An example of one such configuration is illustrated in FIGS. 28A and 28B, where a ball check valve is utilized to control the flow of fluid to and from the pilot manifold 2825. The check valve 2870 includes a ball 2872 that selectively engages an inlet passage 2874 of the pilot manifold 2825. A spring 2876 may be provided for biasing the ball 2872 into engagement with the inlet passage 2874 of the pilot manifold 2825. When the pressure drop across the check valve 2870 exceeds the biasing force exerted by the spring 2876, the ball 2872 will disengage the inlet passage 2874 of the pilot manifold 2825 to allow pressurized fluid to flow from the plenum 2823 to the pilot manifold 2825. The rate at which fluid flows from the hydraulic manifold 2820 to the pilot manifold 2825 is dependent on the pressure drop across the check valve 2870. The greater the pressure drop, the higher the flow rate. In instances where the pressure drop across the check valve 2870 is less then the biasing force of the spring 2876, or the pressure within the pilot manifold 2825 exceeds the pressure within the hydraulic manifold 2820, the check valve ball 2872 will engage the inlet passage 2874 of the pilot manifold 2825 to prevent flow from passing through the check valve 2870 in either direction. The spring rate of the spring 2876 can be selected so as to prevent the check valve 2870 from opening until a desired pressure drop across the check valve 2870 is achieved.

The pilot manifold 2825 may also include an accumulator 2890 for storing pressurized fluid used to actuate the valves 2830 and 2832. The accumulator 2890 may have any of a variety of configurations. For example, a fluid reservoir 2892 for receiving and storing pressurized fluid may be included. The reservoir 2892 may be fluidly connected to the pilot manifold 2825. The accumulator 2890 may include a moveable piston 2894 positioned within the reservoir 2892. The positioning of the piston 2894 within the reservoir 2892 can be adjusted to selectively vary the volume of the reservoir 2892. A biasing mechanism 2896, such as a coil spring, urges the piston 2894 in a direction that tends to minimize the volume of the reservoir 2892. The biasing mechanism 2896 exerts a biasing force that opposes the pressure force exerted by the pressurized fluid present within the pilot manifold 2825. If the two opposing forces are unbalanced, the piston 2894 will be displaced to either increase or decrease the volume of the reservoir 2892, thereby restoring the balance between the two opposing forces. In at least some situations, the pressure level within the reservoir 2892 corresponds to the pressure within the pilot manifold 2825. If the pressure force within the reservoir 2892 exceeds the opposing force generated by the biasing mechanism 2896, the piston 2894 will be displaced toward the biasing mechanism 2896, thereby increasing the volume of the reservoir 2892 and the amount of fluid that can be stored in the accumulator 2890. As the reservoir 2892 continues to fill with fluid, the opposing force generated by the biasing mechanism 2896 will also increase to the point at which the biasing force and the opposing pressure force exerted from within the reservoir 2892 are substantially equal. The volumetric capacity of the reservoir 2892 will remain substantially constant when the two opposing forces are at equilibrium. On the other hand, actuating the pilot valve 2862 will generally cause the pressure level within the pilot manifold 2825 to drop below the pressure level within the reservoir 2892. This coupled with the fact that the pressure forces across the piston 2894 are now unbalanced will cause fluid stored in the reservoir 2892 to be discharged to the pilot manifold 2825 for use in actuating the valves 2830 and 2832.

Figure 29A:
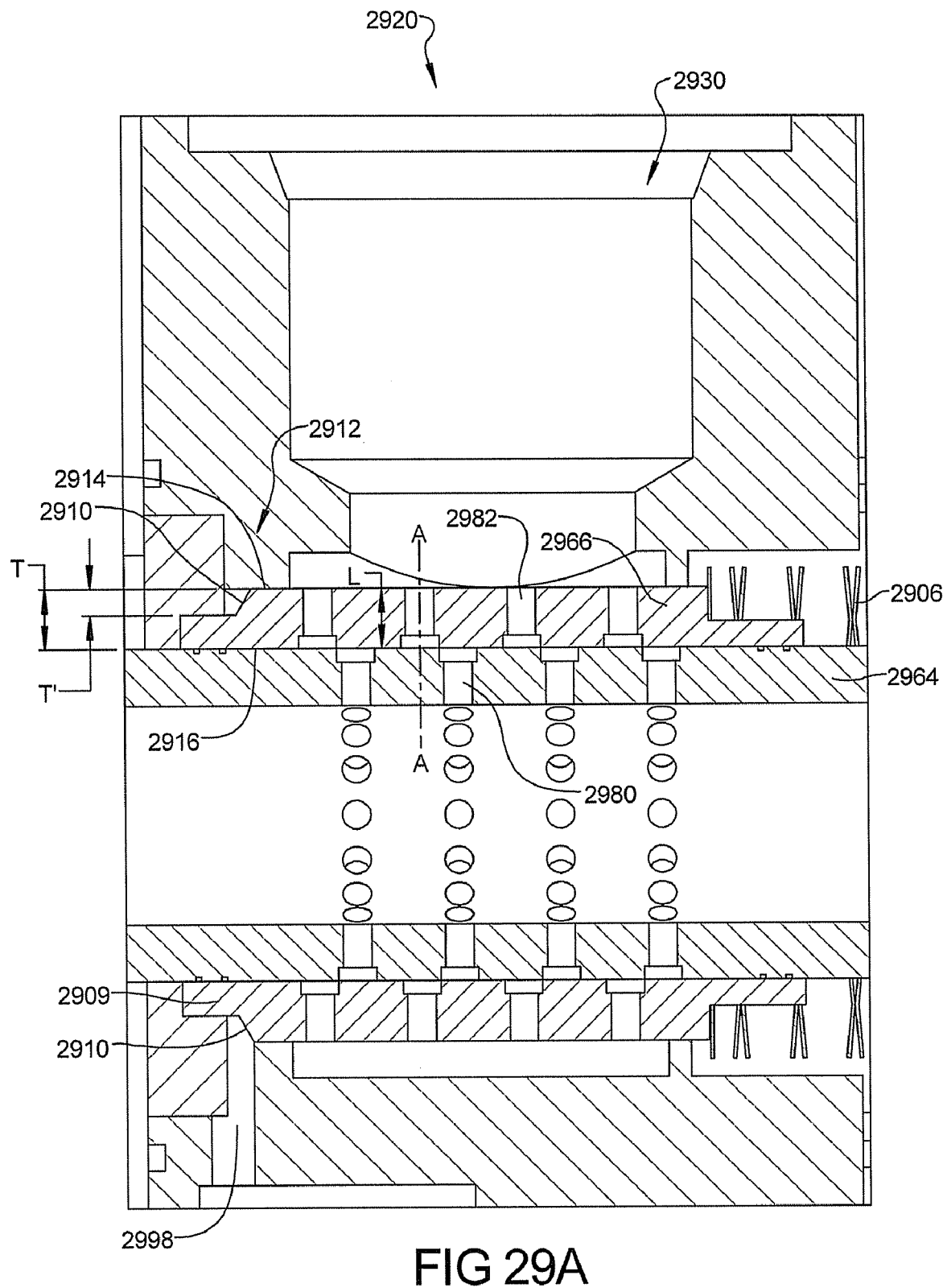
FIG. 29A is a partial cross-sectional view of an exemplary main-stage manifold employing a spool actuation surface located adjacent an outer end surface of the spool.

FIG. 29A illustrates a manifold 2920 that includes a valve 2930. The valve 2930 employs a spool 2966 that includes an actuator 2909 having an actuation surface 2910. The valve 2930 may be a hydraulically actuated spool valve including a generally cylindrical-shaped hollow sleeve 2964 that is fixed relative to the manifold 2920, and the generally cylindrical-shaped spool 2966, which is slideably disposed around the outside of the sleeve 2964. The spool 2966 is free to move back and forth over a portion of the length of the sleeve 2964 between an open position and a closed position. The sleeve 2964 and the spool 2966 each may include a series of orifices that extend through the walls of the respective components, where the spool 2966 includes a series of orifices 2982 and the sleeve 2964 includes a series of orifices 2980.

The valve 2930 may be hydraulically actuated by an actuating device, such as a pilot valve, for moving the spool 2966 from the closed position to the open position. The valve 2930 may also employ a biasing member, illustrated as a return spring 2906, for moving the spool 2866 from the open position to the closed position. Arranging the pilot valve in an open position causes a flow of pressurized fluid to be delivered to a cavity 2998 that is in fluid communication with actuation surface 2910. The pressurized fluid exerts a generally axial force against the actuation surface 2910 of the spool 2966, which tends to displace the spool 2966 axially relative to the sleeve 2964 in a direction toward the return spring 2906. Closing the pilot valve depressurizes the cavity 2998, thereby allowing the return spring 2906 to return the spool 2966 to the closed position.

The actuator 2909 may be located at an end portion 2914 of the spool 2966 opposite the return spring 2906. The orifice 2982 of the spool 2966 may include a longitudinal axis A-A, where a dimension L that represents the length of the orifice 2982 may be measured substantially parallel to the axis A-A. The actuation surface 2910 may also include a thickness T', where the thickness T' may be less than the dimension L of the orifice 2982.

A wall thickness T of the spool 2966 may be greater than wall thickness T' of the actuation surface 2910, and in one example the wall thickness T may also be substantially equal to the dimension L. A wall thickness T may be selected to minimize deflection of the wall that may occur as a result of the pressure drop across the spool 2966. For example, the pressure within the interior region of sleeve 2964 may be higher than the pressure surrounding the outer periphery of the spool 2966. The pressure drop occurring across the spool 2966 may cause the wall of the spool to deflect outward. The amount of deflection is dependent on a variety of factors, including but not limited to, the wall thickness T, the material properties of the spool, and the magnitude of the pressure drop occurring across the spool. The wall deflection can be minimized by, among other things, increasing the wall thickness T.

In at least one example, the spool 2966 may be actuated by exerting a force on a portion of the wall thickness T, such as, for example, the wall thickness T'. The magnitude of the force applied to the spool 2966 is generally a function of the area of the actuation surface 2910 and the magnitude of the applied pressure. Increasing either the applied pressure or the surface area will generally produce a corresponding increase in the axial actuating force applied to the spool 2966. The magnitude of the actuating force can be controlled by adjusting the thickness T' of the actuation surface 2910.

Figure 29B:
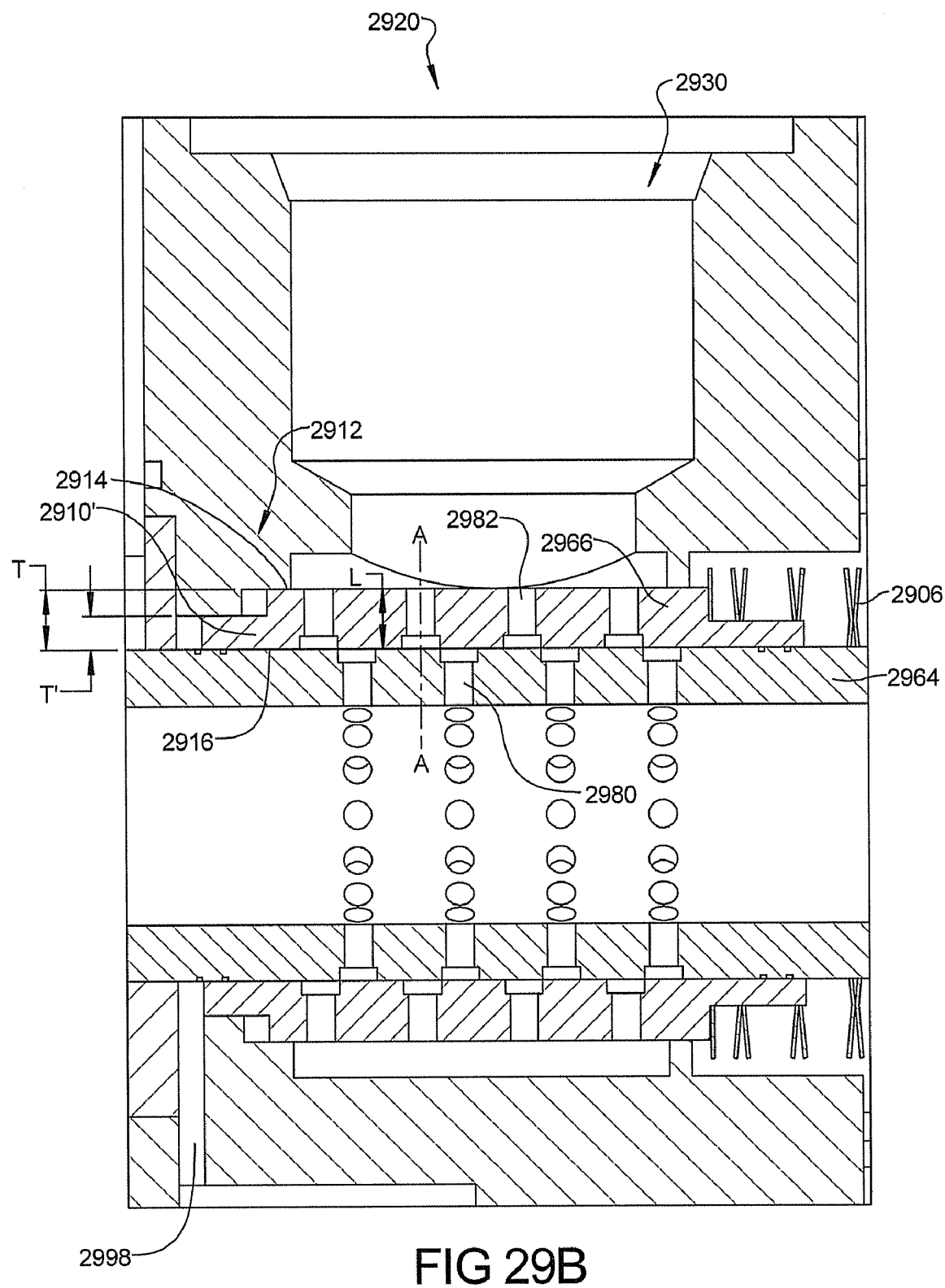
FIG. 29B is a partial cross-sectional view of the exemplary main-stage manifold as shown in FIG. 29A, employing a spool actuation surface located adjacent an inner end surface of the spool.

The actuation surface 2910 may be located adjacent an outer surface 2914 of the spool 2966. Alternatively, as shown in FIG. 29B, an actuation surface 2910' may be located adjacent the inner surface 2916 of the spool 2966. Referring to both FIGS. 29A and 29B, the actuation surfaces 2910 (FIG. 29A) and 2910' (FIG. 29B) provide an area against which pressurized fluid can exert an axial force on the spool 2966 to slide the spool into the open position. Pressure applied against the actuation surfaces 2910 and 2910' urge the spool 2966 into the open position.

Figure 30:
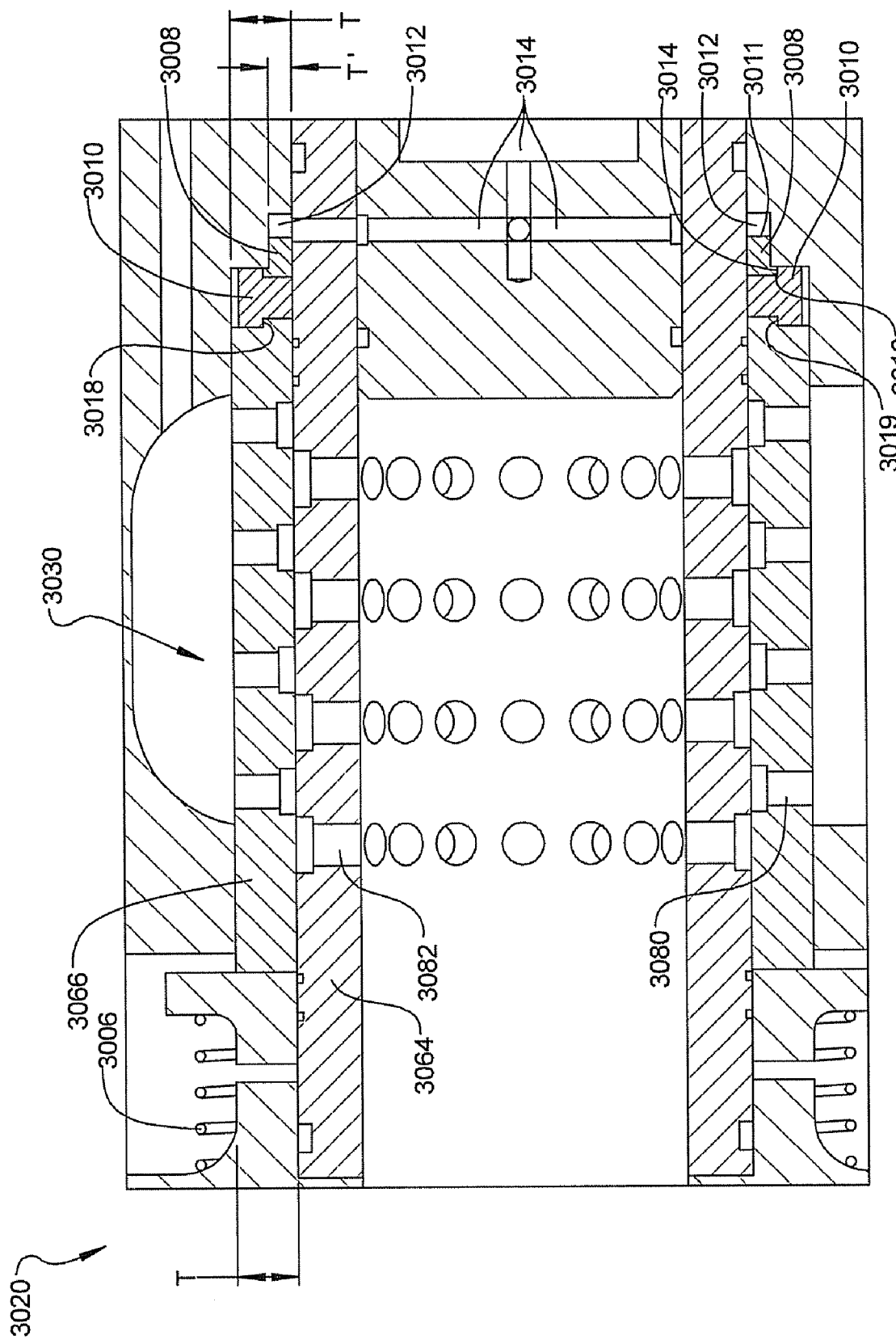
FIG. 30 is a partial cross-sectional view of an exemplary main-stage manifold employing a ring shaped valve actuator.

FIG. 30 is an illustration of a manifold 3020 including a valve 3030. The valve 3030 may be a hydraulically actuated spool valve including a generally cylindrical-shaped hollow sleeve 3064 that is fixed relative to the manifold 3020, and a generally cylindrical-shaped spool 3066, which is slideably disposed around the outside of the sleeve 3064. The spool 3066 is free to move back and forth over a portion of the length of the sleeve 3064 between an open position and a closed position. The sleeve 3064 and the spool 3066 each may include a series of orifices that extend through the walls of the respective components, where the spool 3066 includes a series of orifices 3080 and the sleeve 3064 includes a series of orifices 3082. The spool 3066 is shown arranged in the closed position in FIG. 30, wherein the orifices 3080 of the spool 3066 are substantially fluidly disconnected from the orifices 3082 of the sleeve 3064. Placing the spool 3066 in the open position (i.e., by sliding the spool to the left in FIG. 30) fluidly connects the orifices 3080 in the spool with the orifices 3082 in the sleeve 3064.

The valve 3030 may include an actuator 3008 arranged at a distal end of the spool 3066 for moving the spool 3066 between the open position and the closed position. The actuator 3008 may have a similar configuration as the actuator 2909 shown in FIG. 29B. In one example, the spool actuator 3008 may be a generally annular ring that may be fixedly attached to the spool 3066 by means of a connector 3010. The actuator 3008 provides an actuating surface 3011 against which an actuating force can be applied to urge the spool 3066 from the closed position to the open position. The valve 3030 may also included a biasing member, illustrated as a return spring 3006, for moving the spool 3066 from the open position to the closed position.

The spool actuator 3008 may include a wall thickness T'. Similar to the illustration in FIGS. 29A-29B, the thickness T' of the spool actuator 3008 may be less than a wall thickness T of the spool 3066 in order to achieve a desired actuating force while allowing the spool 3066 to maintain a desired wall thickness T across the portion of the spool 3066 including the orifices 3080. The force required to actuate the spool 3066 may be varied by changing the thickness T' of the spool actuator 3008. This configuration allows the wall thickness T' of the spool actuator 3008 to be sized to obtain a desired actuation force and the wall thickness T of the spool 3066 to be sized to minimize outward deflection of the spool 3066.

The spool actuator 3008 may be connected to the spool 3066 using the connecting member 3010. The connecting member 3010 may include a lip 3014 that engages a corresponding lip 3016 on the spool actuator 3008, and a second lip 3018 that engages a corresponding lip 3019 on the spool 3066 Other means that may be used to connect the connecting member 3010 to the spool 3066 and the spool actuator 3008, include but are not limited to, brazing, welding, and gluing. The type of connection method employed will depend at least in part on the type of materials used and the structural requirements of the connection.

Manifold 3020 may include an actuation chamber 3012 that is in fluid communication with the actuation surface 3010 of the spool actuator 3008. The spool actuator 3008 may be at least partially located within the actuation chamber 3012. An actuation flow port 3014 may also be provided for supplying pressurized fluid to the actuation chamber 3012 for actuating the valve. The actuation flow port 3014 may be fluidly connected to a pressure source, such as a pump. The actuation chamber 3012 receives fluid pressure from the actuation flow port 3014. The fluid pressure in the actuation chamber 3012 provides the actuation force used to move the spool 3066 axially within the manifold 3020 to the open position. The actuation force may be exerted on the spool actuator 3008 by the pressurized fluid located within the actuation chamber 3012 to displace the spool 3066 toward the open position. Pressurized fluid may be released from the actuation chamber 3012 to allow the return spring 3006 to urge the spool 3066 into the closed position.

Figure 31:
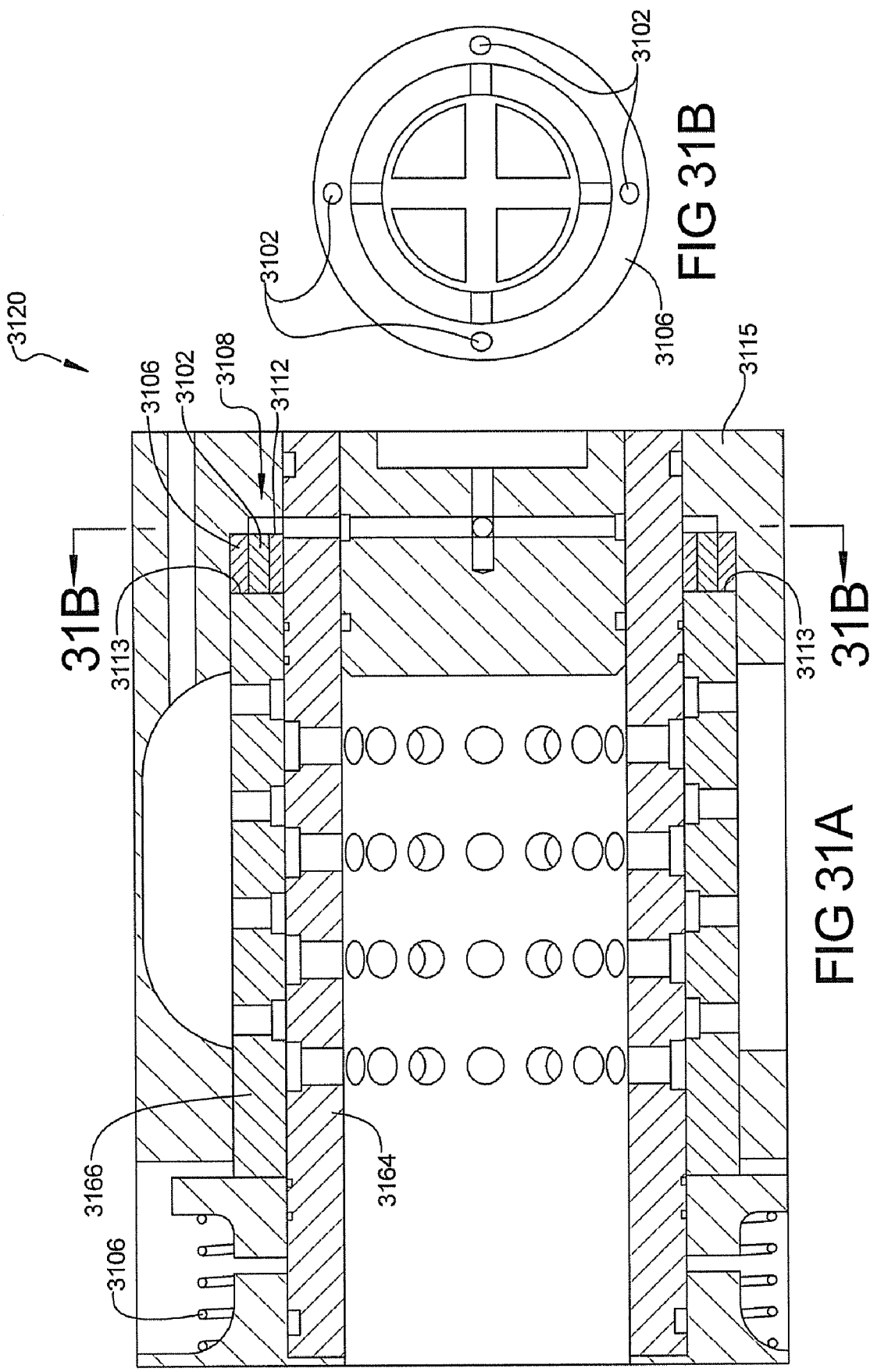
FIG. 31A is partial cross-sectional view of an exemplary main-stage manifold employing a pin shaped valve actuator.
FIG. 31B is a partial cross-sectional end view of the main-stage manifold shown in FIG. 31A.

Referring to FIG. 31A, an alternative configuration of a spool actuator 3108 includes at least one pin 3102 that may be in communication with a distal actuation end 3113 of a spool 3166. The pins 3102 may be housed within a spool actuator housing 3106 that acts as a guide for the pins 3102 to slide axially within the actuator housing. An actuation chamber 3112 is located adjacent one end of the pin 3102. A least a portion of the pin 3102 is in fluid communication with the actuation chamber 3012.

The actuation chamber 3112 receives pressurized fluid from a pressure source. The pressurized fluid provides the actuation force used to move the spool 3166 axially within the manifold 3120 to an open position. The actuation force may be exerted on the pins 3102 by the pressurized fluid located within the actuation chamber 3112. The actuation force exerted on the ends of the pins 3102 urges the spool 3166 toward the open position. A biasing member, illustrated as a return spring 3106, may be provided to urge the spool 3166 back to the closed position.

In one exemplary configuration, as shown in FIG. 31B, four pins 3102 may be arranged within the actuator housing 3106. The actuator housing 3106 may be fixedly attached to a valve housing 3115. The actuator housing 3106 may also be configured as part of the valve housing 3115. It should be noted that while FIG. 31B illustrates fours pins 3102 arranged within the actuator housing 3106 and located equidistant from one another, other configurations using a different number of pins or a different distribution may be used as well. For example, the pin housing 3102 may include five or more pins 3102 that are spaced at unequal distances from one another.

Figure 32:
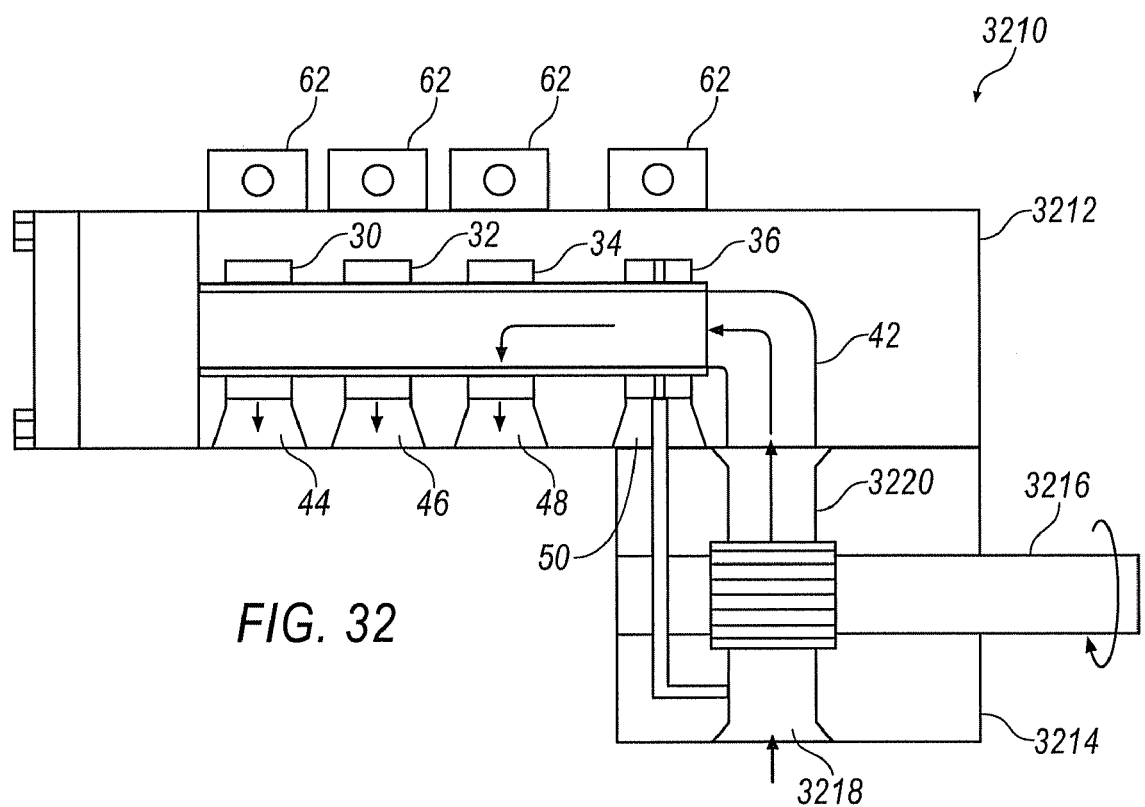
FIG. 32 is a schematic representation of an integrated hydraulic fluid distribution module for minimizing compressible fluid volume and improving system operating efficiency.

With reference to FIGS. 1 and 32, hydraulic manifold 20 (see FIG. 1A) may be integrated with a pump 3212 to form an integrated fluid distribution module 3210. Integrating the various devices may improve system efficiency by reducing the volume of compressible fluid present within the hydraulic system, which in turn may reduce the total amount of work required to compress the fluid present within the hydraulic system.

For clarity, those components and features of the fluid distribution module 3210 that are in common with the hydraulic manifold 20 are identified using like reference numbers in FIG. 32. Fluid distribution module 3210 may include the control valves 30, 32, 34 and 36 of hydraulic manifold 20. The control valves 30, 32, 34 and 36 may be disposed in a common housing 3212. Exit ports 44, 46, 48 and 50 of the control valves 30, 32, 34 and 36, respectively, are accessible from outside housing 3212 for fluidly connecting various hydraulic loads (not shown) to fluid distribution module 3210. One or more of the control valves may also employ the solenoid operated pilot valve for actuating the respective control valve.

Pressurized fluid for driving various hydraulic loads (not shown) fluidly connected to the control valves may be provided by a fixed displacement pump 3214. Pump 3214 may include any of a variety of known fixed displacement pumps, including but not limited to, gear pumps, vane pumps, axial piston pumps, and radial piston pumps. The pump 3214 includes a drive shaft 3216 for driving the pump. The drive shaft 3216 can be connected to an external power source, such as an engine, electric motor, or another power source capable of outputting a rotational torque. An inlet port 3218 of the pump 3214 may be fluidly connected to a fluid reservoir (not shown). The inlet port 42 of the hydraulic manifold may be fluidly connected to a discharge port 3220 of pump 3214.

Although a single pump 3214 is illustrated for purposes of discussion, fluid distribution module 3210 may include multiple pumps, each having their respective discharge ports fluidly connected to a common fluid node from which the individual fluid circuits can be supplied with pressurized fluid. The multiple pumps may be fluidly connected, for example, in parallel to achieve higher flow rates, or in series, such as when higher pressures for a given flow rate are desired.

With regard to the processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

It is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A valve comprising:
   a housing;
   a first valve member disposed within the housing and including a first orifice; and
   a second valve member disposed within the housing and including a second orifice, the second valve member movable relative to the first valve member between an open position, in which the first orifice is fluidly connected the second orifice, and a closed position in which the first orifice is substantially fluidly disconnected from the second orifice;

an elastically deformable damper engaging the second valve member, the damper including a stop region that engages the housing when the second valve member is in one of the open position and the closed position, and is disengaged from the housing when the second valve member is in a remaining position; and a biasing member that urges the second valve member toward the closed position, where at least a portion of the damper is positioned between the second valve member and the biasing member.

2. The valve of claim 1, wherein a first region of the damper includes a shoulder that engages the housing when the second valve member is arranged in the closed position.

3. The valve of claim 1, wherein the damper is fixedly attached to the second valve member.

4. The valve of claim 1, wherein the damper is constructed from a polyetheretherkeone having about a twenty percent carbon fiber filler.

5. The valve of the claim 1, wherein one end of the biasing member engages the damper and an opposite end engages the housing.

6. The valve of claim 1, wherein at least a portion of the damper is disposed within the biasing member.

7. A valve comprising:
a housing;
a first valve member disposed within the housing and including a first orifice;
a second valve member disposed within the housing and including a second orifice, the second valve member movable relative to the first valve member between an open position, in which the first orifice is fluidly connected the second orifice, and a closed position in which the first orifice is substantially fluidly disconnected from the second orifice, the second valve member having a first end and a second end;

a first elastically deformable damper connected to the first end of the second valve member, the first damper having a stop region that engages the housing when the second valve member is in the closed position and is disengaged from the housing when the second valve member is in the remaining position; and a second elastically deformable damper that engages the second end of the second valve, the second damper engaging the housing when the second valve member is in the open position and is disengaged from the housing when the second valve member is in the closed position.

8. The valve of claim 7, wherein the second valve member is moveable along a longitudinal axis relative to the first valve member, the stop regions arrange substantially perpendicular to the longitudinal axis.

9. The valve of claim 7, further comprising a biasing member for urging the second valve member toward the closed position, the biasing member having one end engaging the housing and an opposite end engaging the second damper.

10. The valve of claim 9, wherein the second biasing member applies a biasing force for maintaining contact between the second damper and the second valve member.

* * * * *